United States Patent
Tanaka et al.

(10) Patent No.: US 7,918,238 B2
(45) Date of Patent: Apr. 5, 2011

(54) FLOW CONTROLLER AND ITS REGULATION METHOD

(75) Inventors: Makoto Tanaka, Yokkaichi (JP); Shigehiro Suzuki, Kuwana (JP)

(73) Assignee: Hitachi Metals, Ltd., Tokyo (JP)

( * ) Notice: Subject to any disclaimer, the term of this patent is extended or adjusted under 35 U.S.C. 154(b) by 553 days.

(21) Appl. No.: 10/569,783

(22) PCT Filed: Jun. 20, 2005

(86) PCT No.: PCT/JP2005/011684
§ 371 (c)(1),
(2), (4) Date: Feb. 24, 2006

(87) PCT Pub. No.: WO2005/124492
PCT Pub. Date: Dec. 29, 2005

(65) Prior Publication Data
US 2006/0278276 A1    Dec. 14, 2006

(30) Foreign Application Priority Data

Jun. 21, 2004 (JP) .................................. 2004-182362
May 26, 2005 (JP) .................................. 2005-153314

(51) Int. Cl.
*F16K 31/02* (2006.01)
(52) U.S. Cl. ........ 137/10; 137/486; 137/487.5; 73/1.34; 73/1.35; 700/282
(58) Field of Classification Search .................. 137/486, 137/487.5, 10; 73/1.34, 1.35; 700/282
See application file for complete search history.

(56) References Cited

U.S. PATENT DOCUMENTS

| 2,736,337 | A | * | 2/1956 | Parks et al. ................ 137/492.5 |
| 5,865,205 | A | * | 2/1999 | Wilmer ............................. 137/2 |
| 6,363,958 | B1 | | 4/2002 | Ollivier |
| 6,450,200 | B1 | | 9/2002 | Ollivier |

FOREIGN PATENT DOCUMENTS

| JP | 6-41759 | 2/1994 |
| JP | 6-119059 | 4/1994 |
| JP | 7-78296 | 3/1995 |
| JP | 7-134052 | 5/1995 |
| JP | 7-281760 | 10/1995 |
| JP | 7-306084 | 11/1995 |
| JP | 8-185229 | 7/1996 |

(Continued)

OTHER PUBLICATIONS

English Translation of Written Opinion dated Jan. 11, 2007 from corresponding International Application No. PCT/JP2005/011684.
International Search Report for corresponding PCT Application No. PCT/JP2005/011684, dated Sep. 27, 2005.

(Continued)

*Primary Examiner* — Stephen M Hepperle
*Assistant Examiner* — William McCalister
(74) *Attorney, Agent, or Firm* — Beyer Law Group LLP

(57) ABSTRACT

A mass flow controller arranged to perform mass flow test operation in the controller itself by incorporating a test tank. The mass flow controller is provided, in a channel (6) for feeding fluid, with a means (8) for detecting the mass flow rate of fluid flowing through the channel and outputting a flow rate signal, and a mechanism (10) for controlling the mass flow rate by varying the valve opening by a valve drive signal.

20 Claims, 16 Drawing Sheets (FIRST EMBODIMENT)

FOREIGN PATENT DOCUMENTS

| | | |
|---|---|---|
| JP | 11-45122 | 2/1999 |
| JP | 11-87318 | 3/1999 |
| JP | 11-154022 | 6/1999 |
| JP | 11-223538 | 8/1999 |
| JP | 2004-20306 | 1/2004 |

OTHER PUBLICATIONS

Chinese Office Action dated Jun. 20, 2008 from Chinese Application No. 200580000800.2.

* cited by examiner

FLOW CONTROLLER AND ITS REGULATION METHOD

TECHNICAL FIELD

The invention relates to a flow control device for measuring the flow of fluids in relatively low flow levels such as gas, and in particular to a flow control device and adjustment method capable of testing flow control precision.

BACKGROUND ART

Semiconductor devices such as semiconductor integrated circuits and the like are generally produced by using several types of semiconductor-manufacturing devices to repeatedly carry out etching, CVD film formation, or the like, on semiconductor wafers or the like. In such cases a mass flow controlling device such as a mass flow controller is used because of the need to precisely control the supply of trace amounts of processing gas (See Japanese Unexamined Patent Applications (Kokai) 6-119059, 7-078296, 7-134052, 7-281760, 7-306084, 11-223538, and 2004-20306, U.S. Pat. No. 6,450,200, and Japanese Unexamined Patent Applications (Kokai) 8-185229 and 11-154022).

The structure of common mass flow controllers is illustrated in FIGS. 17 and 18. FIG. 17 schematically illustrates the structure of an example of a conventional mass flow controller inserted into a gas tube, and FIG. 18 is a circuit diagram illustrating the flow detection means in a mass flow controller.

As illustrated, the mass flow controller 2 is inserted into a flow channel, such as a gas tube 4, through which a fluid such as a liquid or gas flows, so as to control the mass flow. A vacuum is created, for example, in the interior of the semiconductor manufacturing device connected to one end of the gas tube 4. The mass flow controller 2 has a channel 6 formed by means of stainless steel, for example, both ends of which are connected to the gas tube 4. The mass flow controller 4 includes mass flow detection means 8 located in the upstream stage of the channel 6, and a flow control valve mechanism 10 located in the downstream stage.

The mass flow detection means 8 has a bypass group 12 comprising a bundle of a plurality of bypass tubes located upstream in the direction in which the gas fluid flows in the channel 6. A sensor tube 14 is connected to both ends of the bypass group 12 to bypass the group, allowing a smaller amount of gas fluid compared to the bypass group 12 to flow at a constant rate therein. That is, a constant proportion of gas relative to the total gas flow always flows into the sensor tube 14. A pair of control resistor wires R1 and R4 connected in series are wound around the sensor tube 14, and flow signals S1 indicating the mass flow level are output by a sensor circuit 16 connected thereto.

The flow signal S1 is input to a control means 18 forming using a micro-computer, for example. The mass flow of the gas currently flowing is determined based on the flow signal S1. The flow control valve mechanism is controlled so that the determined mass flow is consistent with the mass flow represented by an input flow set signal S0. The flow control valve mechanism 10 has a flow control valve 20 located on the downstream side of the channel 6. The flow control valve 20 has a diaphragm 22 made of bendable metal plate, for example, as a valve for directly controlling the mass flow of the gas fluid.

The diaphragm 22 is moved toward the valve opening 24 by being appropriately bent and reshaped, to allow the aperture or the opening degree of the valve opening 24 to be controlled as desired. The upper surface of the diaphragm 22 is connected to the bottom end of an actuator 26 formed using a laminated piezoelectric element (piezo element), thereby allowing the aperture to be adjusted in the manner described above. The actuator 26 is operated by means of the valve drive voltage S2 output by the valve drive circuit 28 upon receiving a drive signal from the control means 18. A sonic nozzle 29 is provided on the outlet side of the valve opening 24, and the gas flow inlet side pressure is set so as to be proportional to the mass flow flowing through the flow control valve 20. An electromagnetic actuator may sometimes be used instead of a laminated piezoelectric element as the actuator 26.

FIG. 18 illustrates the relationship between the sensor circuit 16 and the resistor wires R1 and R4. That is, the serially connected circuits of two reference resistors R2 and R3 are connected in parallel to the serial connection of the resistor wires R1 and R4, forming what is referred to as a bridge circuit. A constant current source 30 for the flow of constant current is connected to the bridge circuit. The connecting point of the resistor wires R1 and R4 and the connecting point of the reference resistors R2 and R3 are connected to the input side, for providing a differential circuit 32. The difference in potential between the two connecting points is determined, and the difference in potential is output in the form of a flow signal S1.

The resistor wires R1 and R4 consist of materials in which the resistance levels vary in response to temperature. The resistor wire R1 is wound around the upstream side in the direction in which the gas flows, and the resistor wire R4 is wound around the downstream side.

When the gas fluid does not flow to the sensor tube 14 in the mass flow controller 2 constructed in the manner described above, since the temperature of the two resistor wires R1 and R4 are the same, the bridge circuit is in equilibrium, and the difference in potential, which is the detected level of the differential circuit 32, is zero, for example.

When the gas fluid flows at a mass flow Q to the sensor tube 14, the gas fluid flows to the position where the resistor wire R4 on the downstream side is wound while warmed by the heat of the resistor wire R1 located on the upstream side. As a result, the heat travels, causing differences in temperature between the resistor wires R1 and R4, that is, differences in the resistance level between the two resistor wires R1 and R4. The difference in potential produced by the differences in the resistance level is virtually proportional to the mass flow of the gas. A certain level of gain in the flow signal S1 thus allows the flow rate of the gas flowing at that time to be determined. The aperture of the flow control valve 20 is controlled by a PID control method, for example, so that the gas mass flow that is detected is consistent with the mass flow represented by the flow set signal S0 (actually, the potential value).

In this type of mass flow controller 2, however, the actual flow in the flow control valve 20 (referred to below as "actual flow") must be precisely consistent with the mass flow represented by the flow set signal (referred to below as "flow"), but when the feed gas pressure changes, or when the device itself changes over time, etc., the application of valve drive voltage equal to the initial level delivered to the device sometimes results in slight differences in the actual flow of the gas.

In view of the foregoing, the present invention was devised in order to effectively address the above problems. An object of the invention is to provide a flow control device and adjustment method in which flow deviation is measured by the device itself.

The present invention relates to Japanese Patent Applications 2004-182362 and 2005-153314, the details of which are hereby incorporated by reference.

SUMMARY OF THE INVENTION

The mass flow controlling device in a first aspect of the invention is a mass flow control device comprising control means for controlling a flow control valve mechanism based on an externally input flow set signal and a flow signal, there being inserted, in a channel through which a fluid flows, mass flow detector means for detecting the mass flow of the fluid that flows through the channel and outputting the flow signal, and the flow control valve mechanism, which controls the mass flow by altering the valve aperture by means of valve drive signals, the mass flow control device characterized by also comprising verification control means, such that there are provided, in the channel, a verification valve for opening and closing the channel, a verification tank having a certain volume, and pressure detector means for detecting the pressure of the fluid and outputting pressure detection signals, the detection valve and detection tank and pressure detector means being used to carry out the mass flow testing operations.

In this way, the device itself is provided with a verification valve, a verification tank, and the like. After the verification valve is closed to stop the supply of fluid, the changes in the pressure of the fluid flowing from the verification tank are detected, and the pressure changes are compared to standard pressure changes, for example, making it possible determine whether or not the mass flow of the fluid can be properly controlled.

In this case, temperature detection means for detecting the temperature is preferably provided near the verification tank.

The testing control means may also preferably have a standard data memory for storing fluid pressure changes during standard measurement, and a testing data memory for storing the changes in fluid pressure during testing.

Warning means may also preferably be connected to the testing control means, and the testing control means may preferably activate the warning means when the test results are outside a certain range.

The testing control means may also preferably calibrate the mass flow detection means based on the test results.

The verification tank may also preferably be inserted into the channel.

Display means for displaying the test results may also preferably be connected to the testing control means.

A zero point measuring valve for opening and closing the channel when measuring zero point may also preferably be inserted on the outlet side of the channel.

The verification valve and zero point measuring valve may also preferably be provided on opposites from each other on either side of the mass flow control means.

At least one of either the verification valve and zero point measuring valve may furthermore comprise a fluid storage chamber having a fluid inlet serving as a valve port and a fluid outlet, a fully closing diaphragm that is located at the fluid inlet and that can be bent and reshaped to close the fluid inlet, and pressing means for pressing the fully closing diaphragm toward the fluid inlet.

The fully closing diaphragm may also preferably be in the form of a flat surface or partially in the form of a spherical shell.

The pressing means may also preferably have an operating space located on the side opposite from the fluid storage chamber on either side of the fully closing diaphragm, and a valve mechanism allowing pressurized fluid to be fed to and discharged from the operating space.

The valve mechanisms may also comprise a three-way valve.

The zero point measuring valve may also preferably be disposed at a location facing opposite the flow control valve mechanism.

The testing control means may also measure zero point by fully closing the verification valve and zero point measuring valve, so that the fluid is completely blocked from flowing into the channel.

The verification valve, verification tank, and pressure detection means may also be located farther upstream than the mass flow detection means and flow control valve mechanism.

The verification valve may preferably be located the farthest upstream in the channel, and the zero point measuring valve may be located the furthest downstream.

The verification valve, verification tank, and pressure detection means may also be located downstream from the mass flow detection means and flow control valve mechanism.

Of the verification valve, verification tank, and pressure detection means, the verification valve may be located the farthest upstream.

In one aspect of the invention, the mass flow control device testing method may preferably be a method comprising the steps of setting the verification flow, ensuring the stable flow of the test fluid in the channel, detecting the pressure of the flowing fluid and the temperature of the storage tank to determine the initial pressure and temperature, closing the verification valve to block the channel, measuring the changes in the pressure of the fluid flowing from the verification tank after the verification valve has been closed, and determining the test results based on the measured pressure changes and predetermined standard pressure change characteristics.

In this case, the test results may preferably be displayed on display means.

A warning may also be issued by the warning means when the test results are outside a certain permissible range.

The mass flow detection means may also be automatically calibrated based on the test results.

The maximum and minimum standard pressure may also be predetermined in the step for determining the test results.

The verification flow may be varied in several volumes.

A step for completely blocking the flow of the fluid in the channel to carry out a step for measuring zero point may be done before the step for setting the verification flow.

At least the verification valve among the verification valve and zero point measuring valve may preferably be completely closed during the zero point measuring step.

The following mass flow control device testing can be done by setting up a verification valve and verification tank, etc., in the mass flow control device. That is, after the verification valve is closed to stop the supply of fluid, the changes in the pressure of the fluid flowing from the verification tank can be detected, and the pressure changes can be compared to standard pressure changes, for example, allowing it to be determined whether or not the mass flow of the fluid can be properly controlled.

The following embodiment of the invention is possible. The flow control device is a device for controlling a flow of a fluid in a channel in which the fluid is supplied to a target where a pressure is lower than a fluid supply source. The flow control device may be equipped with: a first opening and closing valve for opening and closing the channel; a flow control component with a flow control valve mechanism for controlling the flow of the fluid flowing through the channel; a pressure detector capable of detecting a pressure of the fluid on a same side as the flow control valve mechanism relative to the first opening and closing valve; and a deviation measurement/control component for calculating a deviation of the flow controlled by the flow control component from a standard level.

In the adjustment of the flow control device, an aperture of the flow control valve mechanism is fixed. The channel is closed using a first opening and closing valve. Then changes in a pressure of the fluid are measured at a predetermined first position on a same side as the flow control valve mechanism relative to the first opening and closing valve. A deviation of the flow controlled by the flow control component from a standard level is calculated based on the measured pressure changes.

In this embodiment, after the flow of fluid valve is stopped at the first opening and closing, the fluid is allowed to pass through the flow control valve to allow the deviation of the flow controlled by the flow control component to be measured based on the change in pressure at that time. It is thus possible to measure the deviation of the flow controlled by the flow control device set up in the line. It is preferable that the flow control component is adjusted based on the resulting deviation from the standard level.

The various processes, from fixing the aperture of the flow control valve mechanism to the calculation of deviation, may preferably be done repeatedly with varying flow control valve apertures. The flow control component may be adjusted based on the flow deviation at a plurality of apertures obtained in these processes.

In case where the flow control component is further equipped with a flow detector capable of measuring the flow of the fluid flowing through the channel on the same side as the flow control valve mechanism relative to the first opening and closing valve, and controls the flow of the fluid flowing through the channel by adjusting the aperture of the flow control valve mechanism based on a target flow and the flow measured by the flow detector, the following embodiment is preferable. That is, in adjusting the flow control component, an output level representing the flow by the flow detector is adjusted based on the deviation from the standard level.

In this embodiment, the adjusted flow control component can properly control the flow of the fluid flowing in the channel based on the standard level and the detected flow level by the flow detection component.

In adjusting the flow control component, the following arrangement is preferable. The channel is closed using the first opening and closing valve, and also closed using a second opening and closing valve on a side opposite the first opening and closing valve relative to the flow detector. The output level representing the flow by the flow detector is read in the state that the channel is closed by the first and second opening and closing valves. Then an output level representing zero flow by the detector is adjusted. This embodiment allows the output level of the flow detector component to be adjusted as desired.

It is preferable that the flow control device further comprises a accumulator in which the fluid flowing through the channel can be held between the first opening and closing valve and the flow control valve mechanism. In this embodiment, the change in pressure after the first opening and closing valve is closed is more moderate than in embodiments having no accumulator. It is therefore easier to measure the pressure change accurately when adjusting the flow control device.

The deviation may preferably be calculated based on the following measured levels when calculating the flow deviation from the standard level. That is, the deviation from the standard level may be calculated based on: an initial pressure P0 of the fluid in the first position at a first time in a certain time interval including a time the channel is closed by the first opening and closing valve; an absolute temperature T1 of the fluid in a predetermined second position on a same side as the first position relative to the first opening and closing valve at a second time in the certain time interval; and a time period Δt from a time the pressure of the fluid reaches a first standard pressure at the first position after the channel is closed by the first opening and closing valve until a time the pressure reaches a second standard pressure P2 which is different from the first standard pressure P1.

This embodiment allows the flow deviation per unit time of the substance to be calculated taking into account the temperature and the pressure of the fluid during adjustment.

BEST MODE FOR IMPLEMENTING THE INVENTION

Embodiments of the mass flow control device and test method in the invention are illustrated below with reference to the attached drawings.

First Embodiment

Figure 1:
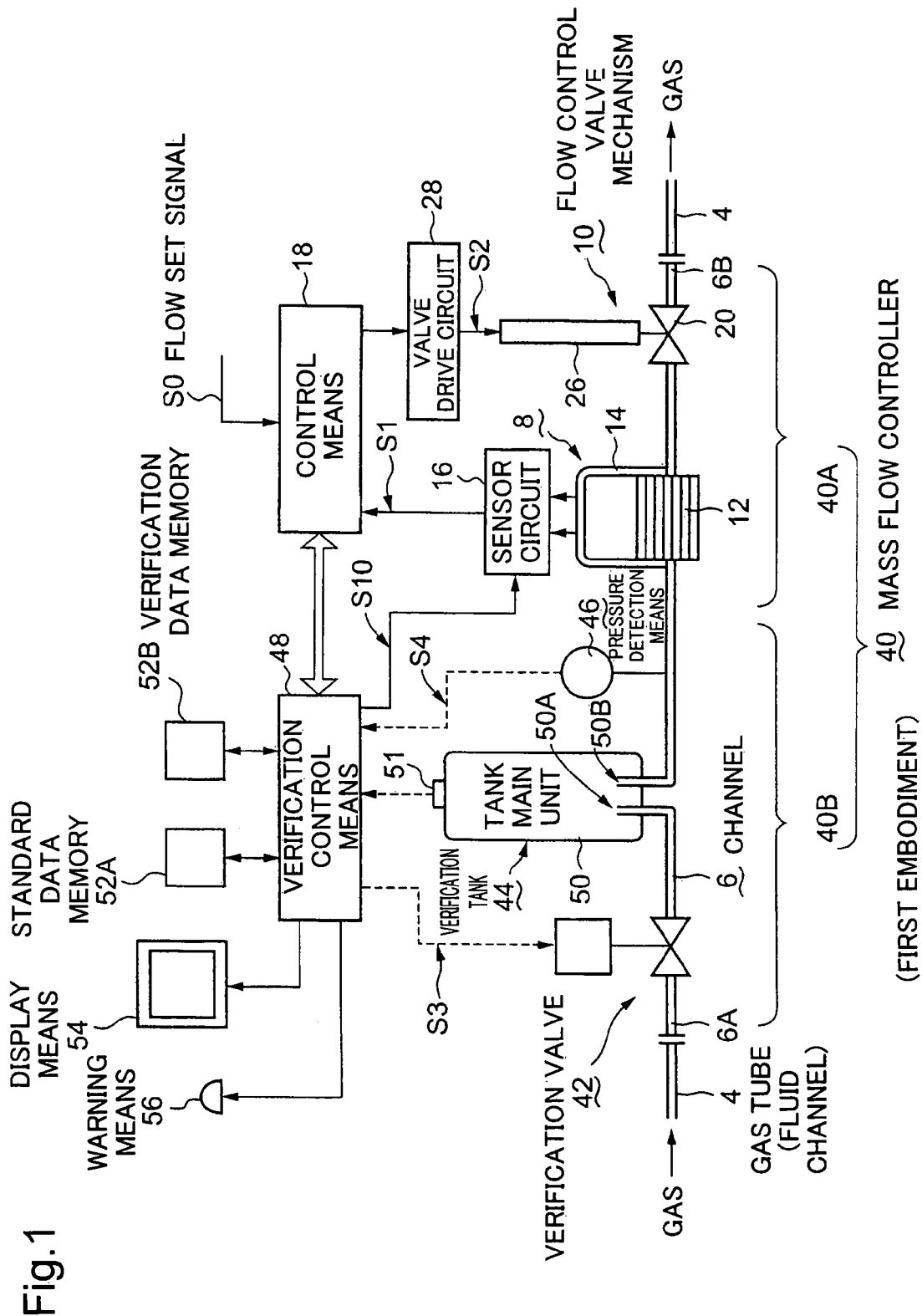
FIG. 1 is a block diagram of a first embodiment of the mass flow control device in the invention.
Figure 2:
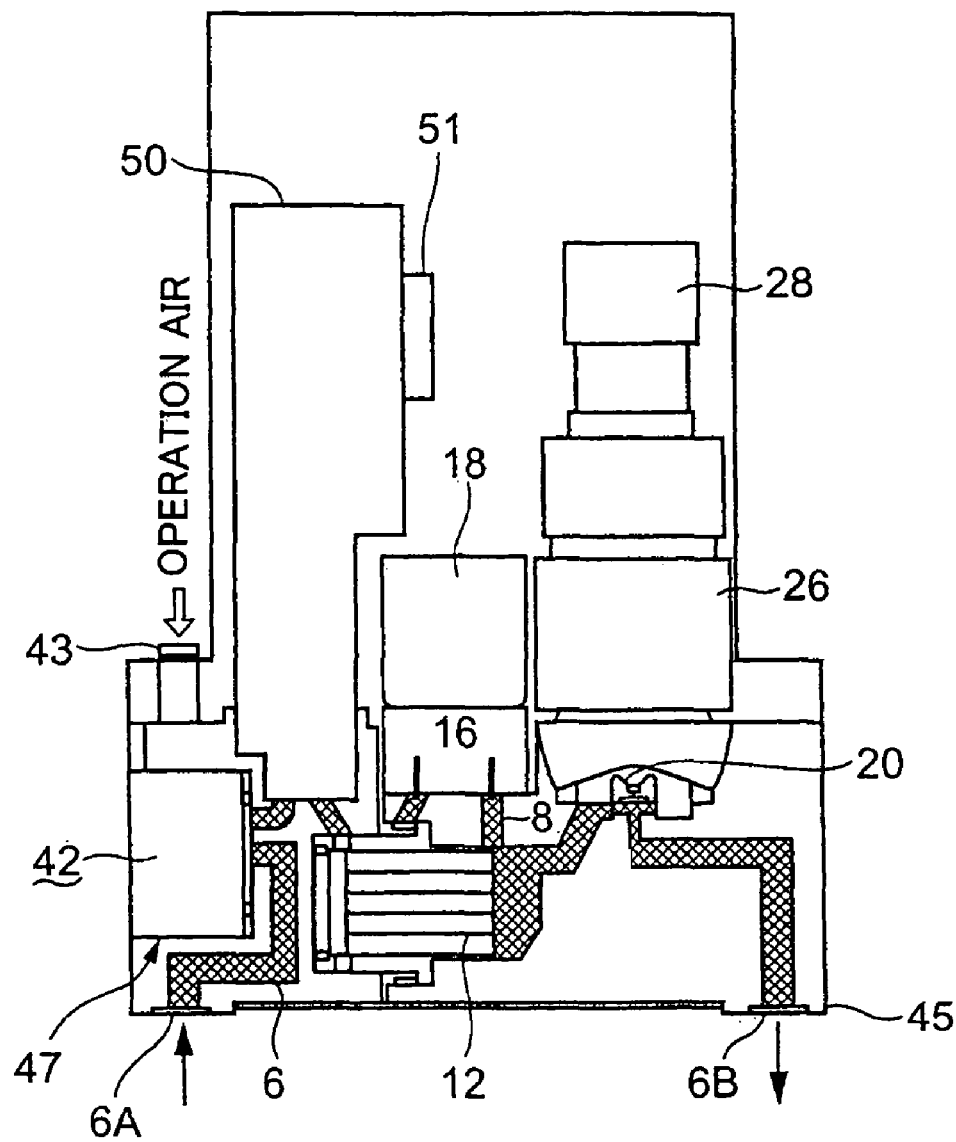
FIG. 2 illustrates the actual lay out of the various parts in the first embodiment.
Figure 17:
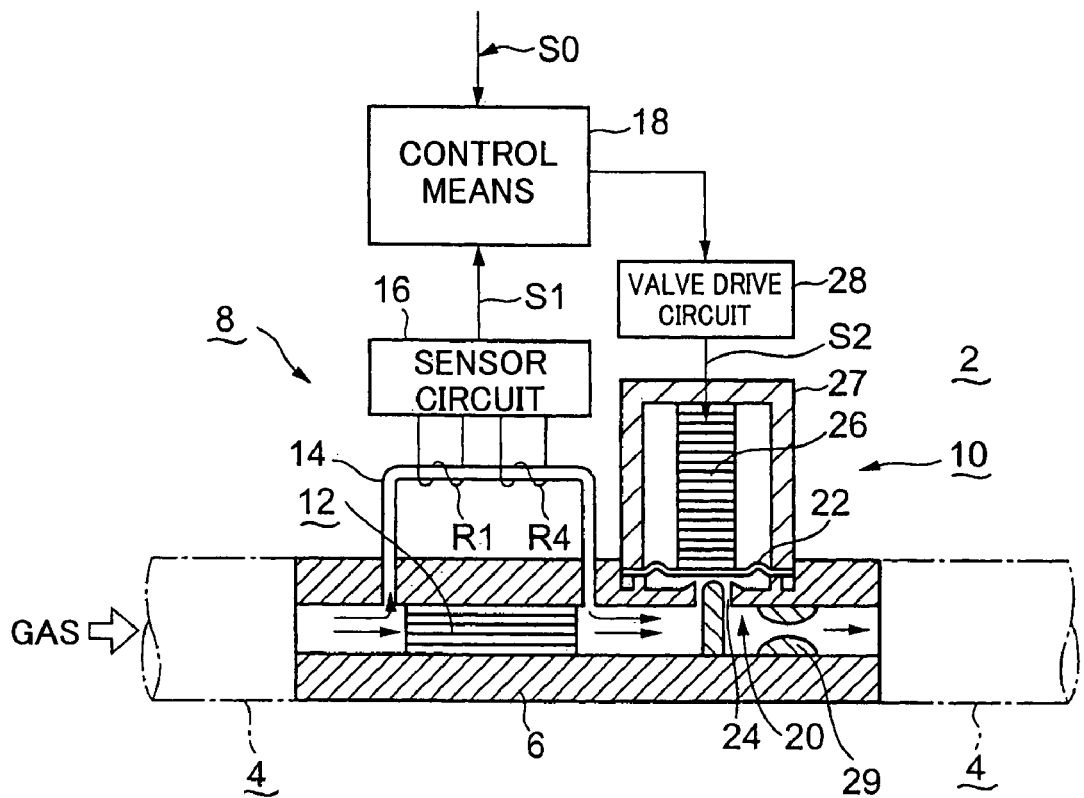
FIG. 17 is a schematic diagram of an example of a conventional mass flow control device inserted into a gas tube.
Figure 18:
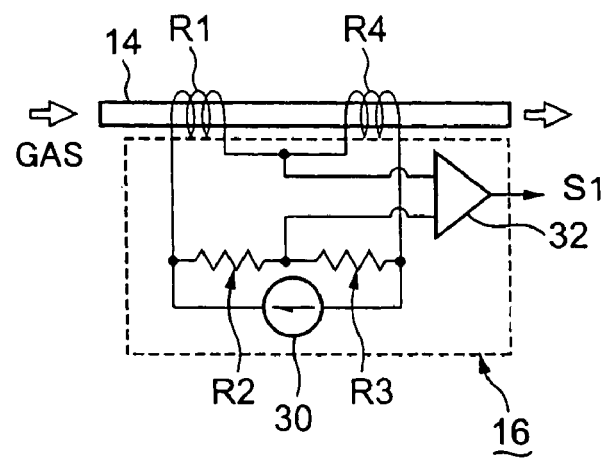
FIG. 18 is a circuit diagram illustrating the flow detection means in a mass flow controller.

FIG. 1 is a block diagram of a first embodiment of the mass flow control device in the invention, and FIG. 2 illustrates the actual lay out of the various parts in the firs embodiment. Parts that are the same as those in FIGS. 17 and 18 are designated by the same symbols and will not be further elaborated.

As illustrated, the mass flow controller 40 is inserted into a fluid channel, such as a gas tube 4, through which a fluid such as a liquid or gas flows, so as to adjust the mass flow (referred to below simply as "flow"). A vacuum is created, for example, in the interior of the semiconductor manufacturing device connected to one end of the gas tube 4. The mass flow controller 40 is equipped with a mass flow control main unit 40A and a test main unit 40B for testing the mass flow characterized by the invention. The mass flow control main unit 40A is sometimes referred to as the mass flow control component 40A below, and the test main unit 40B is sometimes referred to as the testing component. The mass flow controller 40 has a channel 6 formed of stainless steel, for example. The fluid inlet 6A is connected to the upstream side of the gas tube 6, and the fluid outlet 6B is connected to the downstream side of the gas tube 6.

The mass flow control component 40A is built the same as the conventional device illustrated above with reference to FIG. 17, and has, for example, mass flow detection means 8, a flow control valve mechanism 10, and control means 18 forming using a micro-computer, for example. The mass flow detection means 8 has bypass tubes 12, sensor tube 14, sensor circuit 16, and the like. The flow signals S1 detected using these units are output to the control means 18. The flow control valve mechanism 10 has a flow control valve 20, an actuator 26 for driving it, a valve drive circuit 28 for outputting valve drive voltage S2 to the actuator 26, and the like. The control means 18 is such that the aperture of the flow control valve 20 can be adjusted by a PID control method, for example, so that the flow represented by the flow set signal S0 externally input by a host computer, for example, and the flow represented by the flow signal S1 are consistent. In the example that is illustrated, the flow control valve mechanism 10 is set up downstream of the mass flow detection means 8, but it may also be located upstream of the mass flow detection means 8.

The testing component 40B is located upstream of the mass flow control component 40A. The mass flow control component 40A has, in the channel 6, a verification valve 42 for opening and closing the channel 6, a verification tank 44 having a certain volume, pressure detecting means 46 for detecting the pressure of the gas fluid and outputting pressure detection signals, and verification control means 48 constructed using a micro-computer, for example, to carry out the mass flow testing operations using the verification valve 42, verification tank 44, and pressure detecting means 46.

Specifically, the verification valve 42 consists of a pneumatic valve, for example, and is located farthest upstream of the channel 6 in the testing component 40B, so that the channel 6 can be blocked as needed by being opened and closed by the tank valve opening and closing signals S3, which are commands from the verification control means 48. An actuatorless, small valve mechanism housing a three-way valve and a fully closing diaphragm can be used, for example, as the pneumatic valve forming the verification valve 42.

The actuatorless, small valve mechanism bends the fully closing diaphragm by means of operation air introduced through an operation air inlet 43 (see FIG. 2). The actuatorless small valve mechanism selectively brings about two states of the valve opening that are a full open state and a fully closed state that is completely sealed. The actuatorless small valve mechanism is detachably located, in FIG. 2, in an attachment recess 47 formed in a mounting basket unit 45. The structure of the actuatorless small valve mechanism will be described during the description of the zero point measuring valve used in the second embodiment described below. The pressure detecting means 46 is a capacitance manometer, for example, and is such that the pressure of the gas in the channel 6 can be detected, and the detection level can be output in the form of a pressure signal S4 to the verification control means 48.

The verification tank 44 includes a tank main unit 50 formed of stainless steel, for example, and is located between the verification valve 42 and pressure detecting means 46. The tank main unit 50 has a certain volume, such as 40 $cm^3$. A gas inlet 50A and an outlet 50B are provided in the floor of the tank main unit 50, which are inserted into the channel 6. The flowing gas always passes through the interior of the tank main unit 50. A platinum temperature sensor is attached as temperature detection means 51 near the tank main unit 50, specifically, in this case, on the top surface of the ceiling of the tank main unit 50, so that signals indicating the detected temperature can be input to the verification control means 48.

A standard data memory 52A for storing pressure changes serving as a standard for the gas flow (standard pressure changes) when the flow is tested and a testing data memory 52B for storing changes in gas flow pressure obtained when the flow is tested are connected to the verification control means 48.

Display means 54 made of a liquid crystal display, for example, to display the test results and warning means 56 for issuing a warning by means of noise, flashing lights, or the like as needed are also connected to the verification control means 48.

The verification control means 48 outputs calibration signals S10 to the sensor circuit 16 of the mass flow detection means 8 as needed, allowing the sensor circuit 16 to be properly calibrated based on the calibration results. The verification control means 48 and the control means 18 of the mass flow control component 40A are configured to work together as needed.

The operation of the mass flow controller of the invention constructed in the manner described above is described below.

The mass flow controller 40 has two operating modes: a normal operating mode in which the process gas actually flows, while the flow is being adjusted, to a semiconductor manufacturing device or the like, and a test operating mode in which mass flow test-related operations are carried out. The test operating mode has "a standard pressure change characteristics measurement routine" for obtaining pressure changes that serve as the standard, and "a test routing" for carrying out actual testing operations.

The normal operating mode will be briefly described first. The operation is the same as was described earlier with reference to FIGS. 17 and 18. In this case, the operation of the testing component 40B is suspended. That is, the control means 18 of the mass flow control component 40A continuously controls the aperture of the flow control valve 20 by a PID control method, for example, so that the flow represented by the flow set signal S0 externally input by a hot computer, for example, and the flow represented by the flow signal S1 are consistent. Processing gas with the necessary mass flow is thus provided to the downstream semiconductor manufacturing device or the like.

The test operating mode is described next.

Figure 3:
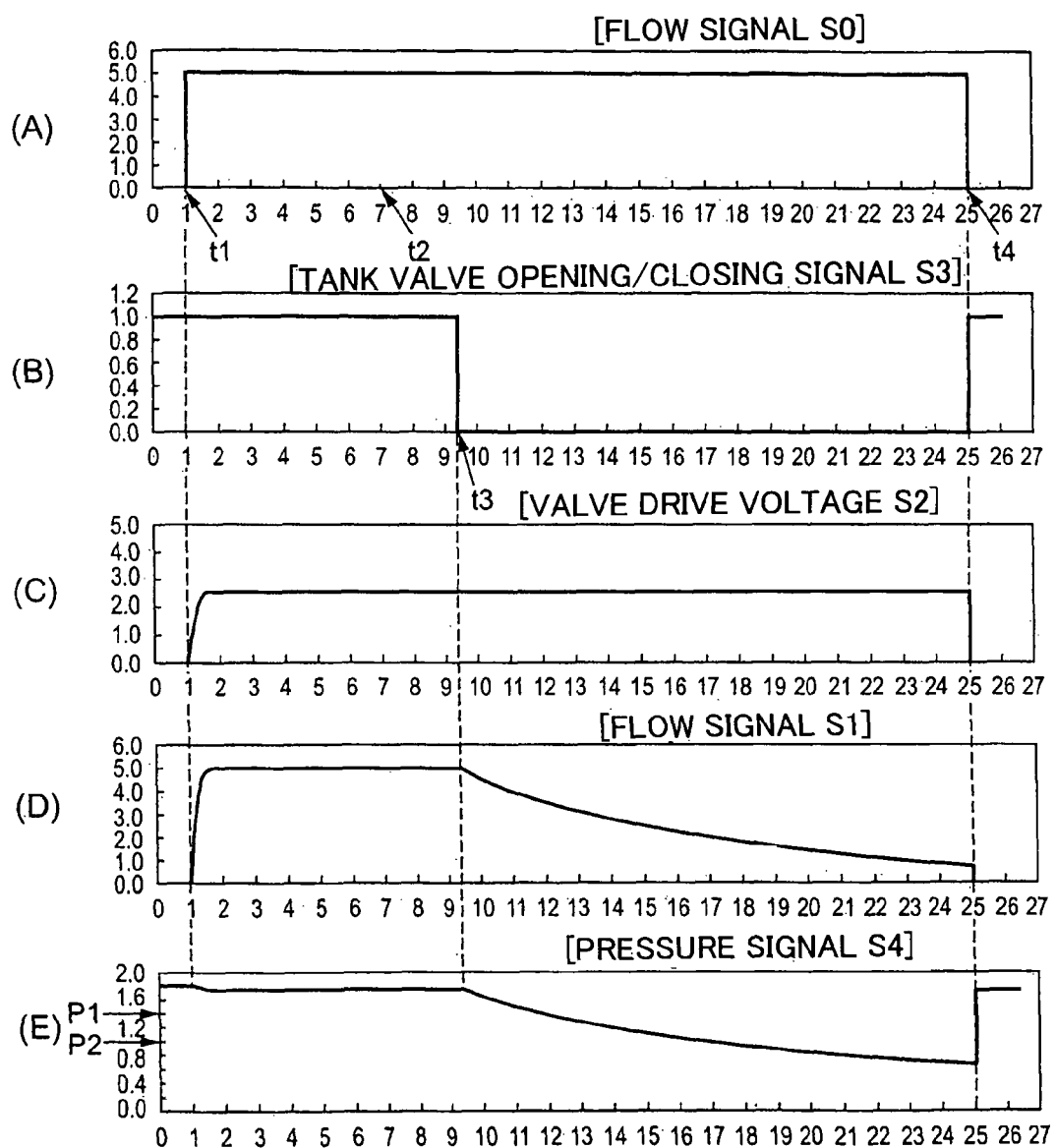
FIG. 3 illustrates a timing chart for the signals during the test operation mode of the mass flow control device.
Figure 4:
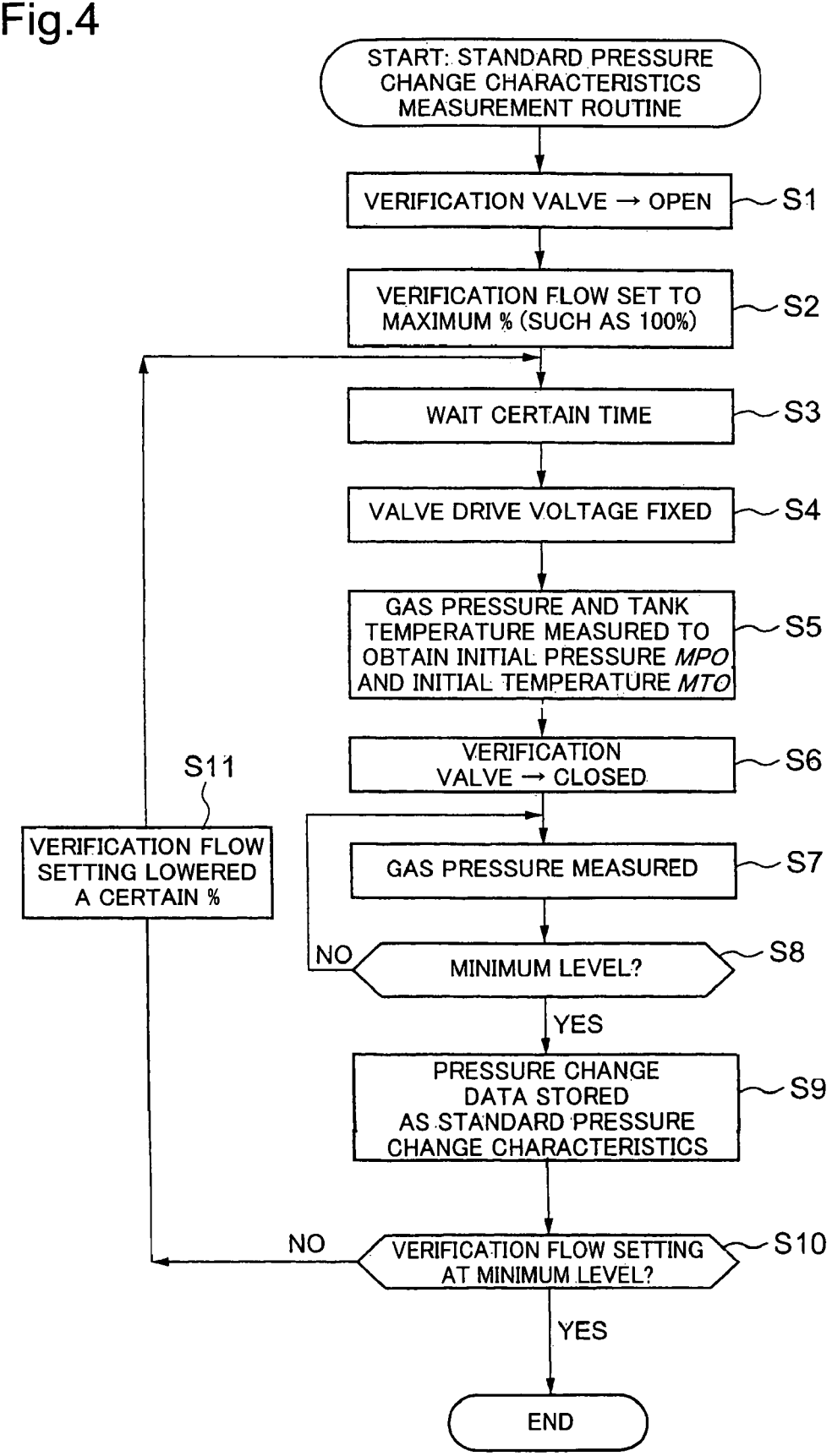
FIG. 4 is a flow chart of the steps involved in a standard pressure change characteristics measurement routine.
Figure 5:
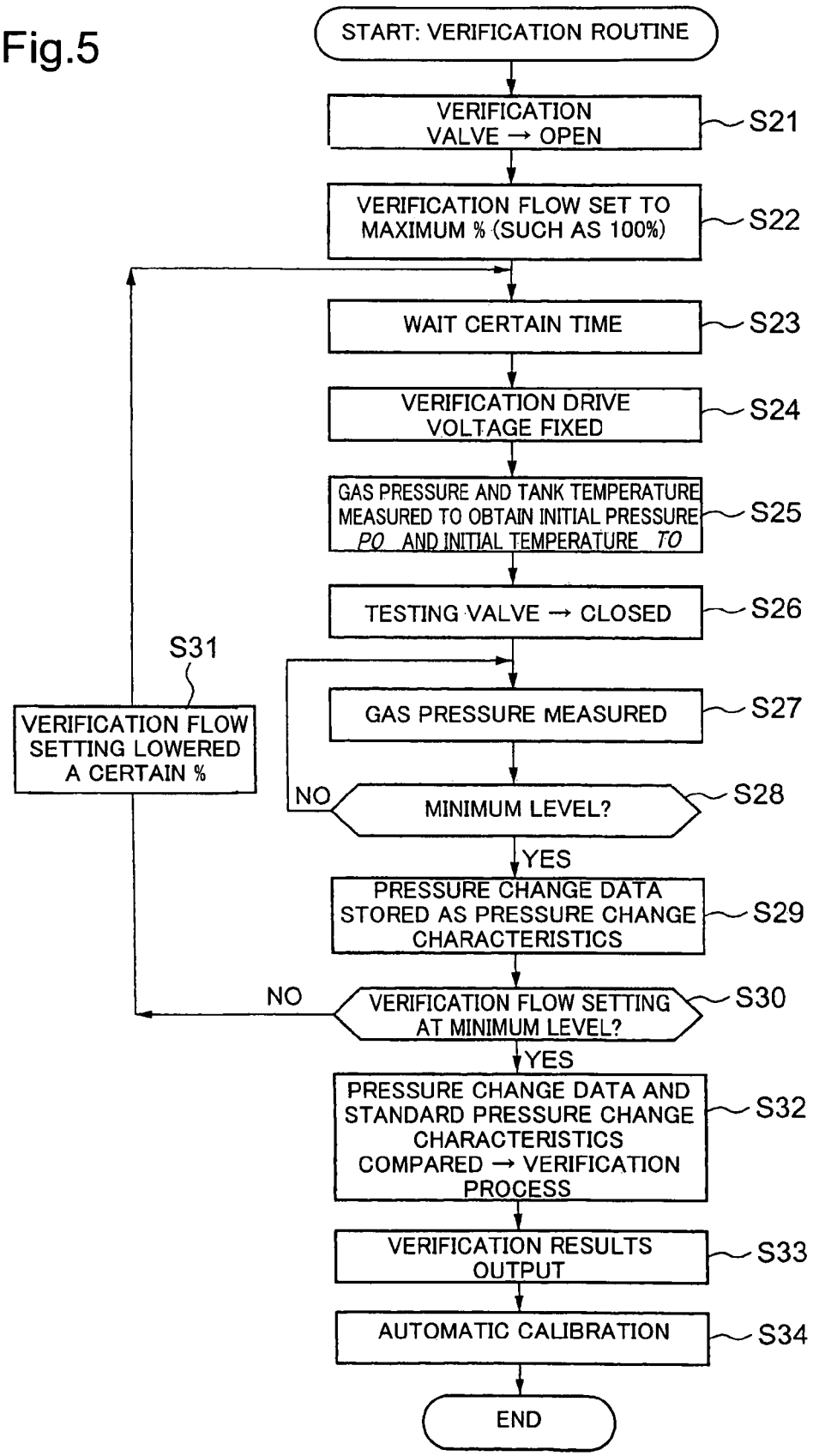
FIG. 5 is a flow chart of the steps in a verification routine.
Figure 6:
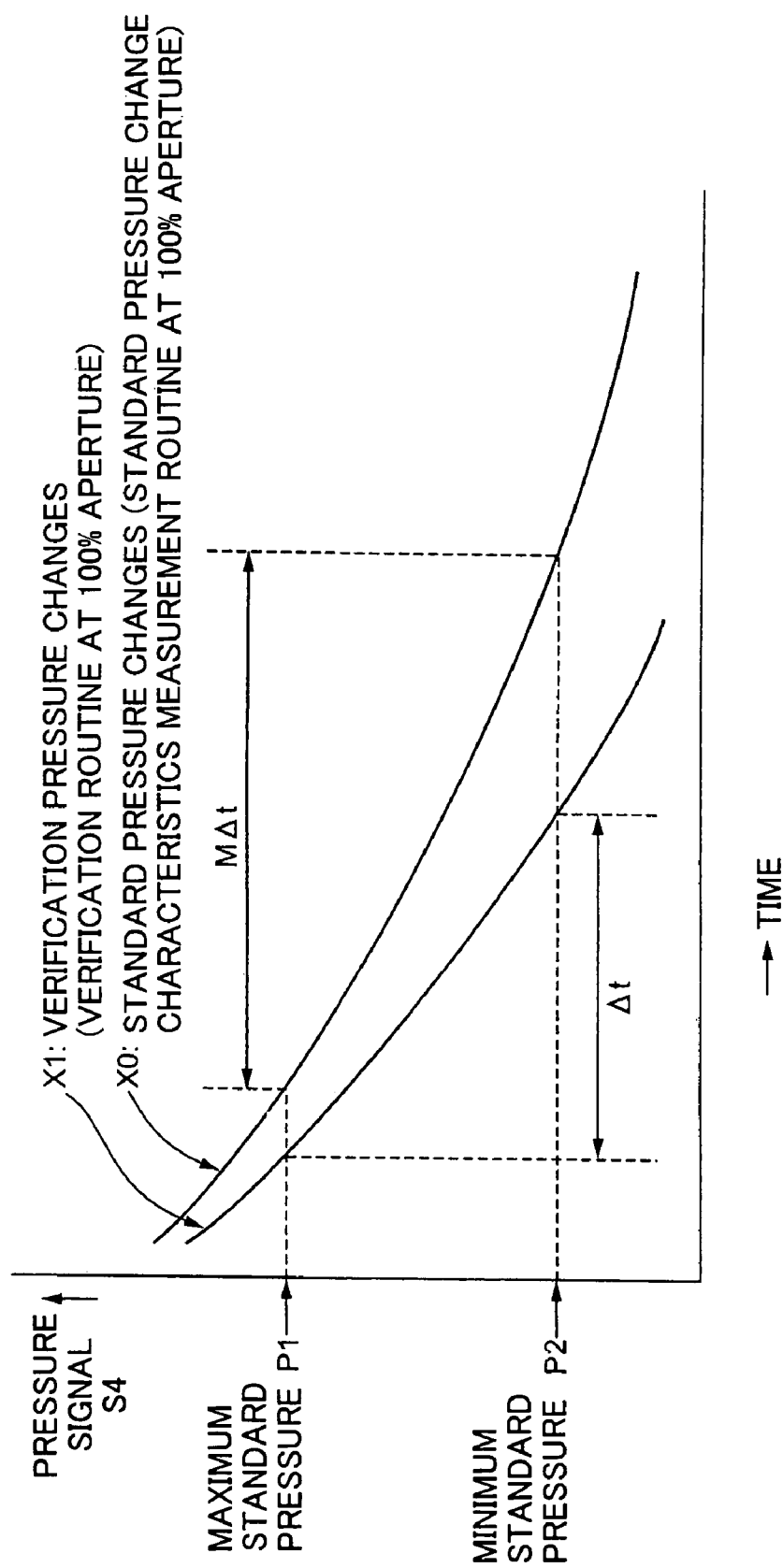
FIG. 6 is a graph of an example of changes in pressure signals in the standard pressure change characteristic measurement routine and verification routine.

In the test operating mode, the standard pressure change characteristics measurement routine is employed to obtain the pressure change characteristics which will serve as the standard, primarily when the device is shipped from the factory, the device is set up in a clean room at the shipping destination, or the like. The testing routine is carried out periodically or non-periodically in a clean room or the like at the shipping destination to test whether or not high control flow precision is be maintained. FIG. 3 illustrates a timing chart for the signals during the test operating mode of the mass flow control device. FIG. 4 is a flow chart of the steps involved in the standard pressure change characteristics measurement routine. FIG. 5 is a flow chart of the steps in the verification routine. FIG. 6 is a graph of an example of changes in pressure signals in the standard pressure change characteristic measurement routine and verification routine.

The verification routine primarily comprises the steps of: setting the verification flow; ensuring the stable flow of the test fluid (gas) in the channel 6; detecting the pressure of the flowing fluid and the temperature of the verification tank 44 to determine the initial pressure and temperature; closing the verification valve 42 to block the channel 6; measuring the changes in the pressure of the fluid flowing from the verification tank 44 after the verification valve 42 has been closed; and determining the test results based on the measured pressure changes and predetermined standard pressure change characteristics. The standard pressure change characteristics measurement routine for determining the standard pressure change characteristics will be described first.

<Standard Pressure Change Characteristics Measurement Routine>

The primary steps of the standard pressure change characteristics measurement routine are the same as the verification routine except for the step comparing the pressure changes. In this case, $N_2$ gas is used, for example, as the fluid. As illustrated in FIGS. 1, 3, and 4, when the standard pressure change characteristics measurement routine is begun, the verification valve 42 is open (step S1). At time t1 (see FIG. 3(A)), the flow set signal S0 is set to full scale (5V: volts) at a percentage, such as 100%, representing the maximum flow that the mass flow controller 40 can control (step S2). As noted above, in normal operating mode, the flow set signal S0 is input to the control means 18 by an external component such as a host computer, whereas in the test operating mode, the flow set signal is input to the control means 18 from the verification control means 48, not a host computer. The control means 18 thus carries out the normal flow control operation according to the flow set signal S0 from the verification control means 48 in the same manner as the externally input flow set signal S0. The flow set signal S0 can generally be varied within the range of 0V to 5V, and is preset so that 5V is 100% full scale (maximum flow).

When 5V is thus set as the flow set signal S0, the control means 18 outputs valve drive voltage S2 (see FIG. 3(C)) through the valve drive circuit 28, and controls the flow control valve 20 so that the aperture matches the flow set signal S0. As the $N_2$ gas thus begins to flow to the downstream side, the mass flow at that time is detected by the mass flow detection means 8, and the detected mass flow is input in the form of a flow signal S1 (see FIG. 3(D)) to the control means 18. The aperture is controlled by a PID control method as noted above so that the flow signal S1 and flow set signal S0 are consistent with each other. At that time, the gas flow pressure is detected by the pressure detecting means 46, and the pressure signal S4 (see FIG. 3(E)) is input to the verification control means 48.

To stabilize the gas flow in this way, when a certain time such as 6 seconds has elapsed (step S3), the aperture is fixed at time t2 by fixing the valve drive voltage S2 to the voltage level at that time (step S4). When the valve drive voltage S2 has thus been fixed and several seconds have elapsed, the pressure of the gas flow from the pressure detecting means 46 at that time and the tank temperature from the temperature detection means 51 at that time are recorded, serving as the initial pressure MPO and initial temperature MTO ° C., respectively (step S5).

When the initial pressure and temperature have been measured and recorded, a tank valve opening/closing signal S3 is immediately output at time t3 to close the valve (see FIG. 3(B)), and the verification valve 42 is switched to a closed state (step S6). The channel 6 is thus blocked, stopping the supply of $N_2$ gas from the gas feed source, but because the tank main unit 50 of the verification tank 44 is filled with enough $N_2$ gas to reach a certain pressure, the $N_2$ gas in the tank main unit 50 flows out downstream, resulting in a characteristics curve in which the flow signal S1 and pressure signal S4 decrease over time, as illustrated in FIGS. 3(D) and 3(E). A vacuum is continuously created on the downstream side of the gas tube 4 at that time, and the aperture of the flow control valve 20 corresponding to the detected flow set in step S2, that is, a flow of 100% in this case, is maintained.

Below, "an aperture corresponding to a flow of X % (based on a certain pressure)" or "an aperture representing a flow of X % (based on a certain pressure)" is also expressed as "an aperture of X %." "Changing (or lowering) the target flow rate for the flow control valve by Y %" is also expressed as "changing (or lowering) aperture by Y %."

The changes in the pressure of the gas flow at this time are measured, for example, in 1 msec intervals (step S7) to obtain the pressure change characteristics at that time. The gas pressure is measured continuously until the gas pressure reaches a predetermined minimum level, and the gas flow is stopped when the minimum level is reached (step S8). This time is time t4. The pressure change data obtained above is stored as the standard pressure change characteristics in the standard data memory 52A (step S9). In this way, the standard pressure change characteristics at the set flow of an aperture of 100% are obtained.

The changes in the pressure of the gas flow at this time are measured, for example, in 1 msec intervals (step S7) to obtain the pressure change characteristics. The gas pressure is measured continuously until the gas pressure reaches a predetermined minimum level, and the gas flow is stopped when the minimum level is reached (step S8). This time is time t4. The pressure change data obtained above is stored as the standard pressure change characteristics in the standard data memory 52A (step S9). In this way, the standard pressure change characteristics at the set flow of an aperture of 100% are obtained.

These standard pressure change characteristics may be preferably acquired for a plurality of apertures. For example, the aperture (flow) may preferably be varied in 10% increments, and the standard pressure change characteristics for each may be obtained. For example, a minimum aperture (flow) may be 10%. The detected flow setting is lowered a certain amount, such as 10%, while the detected flow setting is not at the minimum (step S10: No). The detected flow setting is set to 90%, at this stage (step S11). The above steps S3 through S9 are repeated until the aperture reaches the minimum. In this way, different standard pressure change characteristics are obtained in aperture increments of 10%, and the data is stored in the standard data memory 52A, thereby completing the standard pressure change characteristics measurement routine.

<Verification Routine>

The verification routine, which is implemented periodically or non-periodically, is described next. The verification routine is carried out, with the mass flow controller 40 incorporated in the gas feed line of a semiconductor manufacturing device or the like in a clean room. In this case, $N_2$ gas is used as the fluid.

Steps S21 to S31 in the flow chart of FIG. 5 are the same as steps S1 through S11 in the flow chart of FIG. 4, except for the difference in the name of the pressure change data that is obtained. As such, for the sake of convenience, the timing chart in FIG. 3 used as reference for the description of the standard pressure change characteristics measurement routine will also be used as reference for the description of the verification routine. However, this does not mean that the standard pressure change characteristics measurement routine and verification routine are identical. As illustrated in FIGS. 1, 3, and 5, when the verification routine starts, the verification valve 42 is open (step S21). At time t1 (see FIG. 3(A)), the flow set signal S0 is set to full scale (5 V: volts) at the maximum %, such as 100% such (step S22). In this test operating mode, the flow set signal S0 is output to the control means 18 from the verification control means 48, not a host computer. The control means 18 thus carries out the normal flow control operation according to the flow set signal S0 from the verification control means 48 in the same manner as the externally input flow set signal S0. As noted above, the flow set signal S0 can generally be varied within the range of 0V to 5V, and is preset so that 5V is 100% full scale (maximum flow).

When 5V is thus set as the flow set signal S0, the control means 18 outputs valve drive voltage S2 (see FIG. 3(C)) through the valve drive circuit 28, and controls the flow control valve 20 so that the aperture matches the flow set signal S0. As the $N_2$ gas thus begins to flow to the downstream side, the mass flow at that time is detected by the mass flow detection means 8, and the detected mass flow is input in the form of a flow signal S1 (see FIG. 3(D)) to the control means 18. The aperture is controlled by a PID control method as noted above so that the flow signal S1 and flow set signal S0 are consistent with each other. At that time, the gas flow pressure is detected by the pressure detecting means 46, and the pressure signal S4 (see FIG. 3(E)) is input to the verification control means 48.

To stabilize the gas flow in this way, when a certain time such as 6 seconds has elapsed (step S23), the aperture is fixed at time t2 by fixing the valve drive voltage S2 to the voltage level at that time the (step S24). When the valve drive voltage S2 has thus been fixed and several seconds have elapsed, the pressure of the gas flow from the pressure detecting means 46 at that time and the tank temperature from the temperature detection means 51 at that time are recorded, serving as the initial pressure PO and initial temperature TO ° C., respectively (step S25).

When the initial pressure and temperature have been measured and recorded, a tank valve opening/closing signal S3 is immediately output at time t3 to close the valve (see FIG. 3(B)), and the verification valve 42 is switched to a closed state (step S26). The channel 6 is thus blocked, stopping the supply of $N_2$ gas from the gas feed source, but because the tank main unit 50 of the verification tank 44 is filled with enough $N_2$ gas to reach a certain pressure, the $N_2$ gas in the tank main unit 50 flows out downstream, resulting in a characteristics curve in which the flow signal S1 and pressure signal S4 decrease over time, as illustrated in FIGS. 3(D) and 3(E). A vacuum is continuously created on the downstream side of the gas tube 4 at that time, and the aperture of the flow control valve 20 maintains the flow detected in step S22, which in this case is 100%.

The changes in the pressure of the gas flow at this time are measured, for example, in 1 msec intervals (step S27) to obtain the pressure change characteristics. The gas pressure is measured continuously until the gas pressure reaches a predetermined minimum level, and the gas flow is stopped when the minimum level is reached (step S28). This time is time t4. The pressure change data obtained above is stored as the test pressure change characteristics in the verification data memory 52B (step S29). In this way, the standard pressure change characteristics at the set flow of an aperture of 100% are obtained.

These test pressure change characteristics may be preferably acquired for a plurality of apertures in the same manner as for the standard pressure change characteristics. For example, the aperture may preferably be varied in 10% increments, and the test pressure change characteristics for each may be obtained. For example, a minimum aperture may be 10%. The detected flow setting is lowered a certain amount, such as 10%, while the detected flow setting is not at the minimum (step S30: No). The detected flow setting is set to 90%, at this stage (step S31). The above steps S23 through S29 are repeated until the aperture reaches the minimum. In this way, different test pressure change characteristics are obtained in aperture increments of 10%, and the data is stored in the verification data memory 52B, thereby completing the test pressure change characteristics measurement routine.

When the test pressure change characteristics have thus been obtained, they are compared to the standard pressure change characteristics for each aperture (each detected flow set level) to carry out the test process (step S32).

A way to determine the testing precision, the test results, is described here with reference to FIG. 6. FIG. 6 is a graph of an example of changes in pressure signals S4 in the standard pressure change characteristic measurement routine and verification routine at an aperture of 100%. The characteristics curve X0 shows the standard pressure changes at an aperture of 100%, and the characteristics curve X1 shows the test pressure change characteristics at an aperture of 100%. As noted above, both characteristics curves are stored in the standard data memory 52A and testing data memory 52B, respectively.

MΔt and Δt in relation to the predetermined pressure range from the maximum standard pressure P1 to the minimum standard pressure P2 are set in the following manner. That is, MΔt is the time it takes the pressure obtained in the standard pressure change characteristics measurement routine to reach the minimum standard pressure P2 after reaching the maximum standard pressure P1. At is the time it takes the pressure obtained in the verification routine to reach the minimum standard pressure P2 after reaching the maximum standard pressure P1.

The detection precision at that time is represented by the following equation.

$$H = M\Delta t/\Delta t \times PO/MPO \times (273+MTO)/(273+TO) \times 100 (\%) \quad (1)$$

MTO: initial temperature in standard pressure change characteristics measurement routine TO: initial temperature in verification routine MPO: initial pressure in standard pressure change characteristics measurement routine PO: initial pressure in verification routine Equation (1) is obtained in the following manner. That is, the equation of state relative to n mol ideal gas is PV=nRT. These symbols indicate the following physical values.

P: pressure of ideal gas
V: volume of ideal gas
R: gas constant
T: absolute temperature (K)

Assuming a virtually constant volume when the pressure changes from the standard pressure P1 to the standard pressure P2, the amount An of the substance flowing at that time is Δn=(P2−P1)V/RT. Here, the amount v of the substance per unit time is v=(P2−P1)V/(RTΔt), where Δt is the time elapsed when the pressure changes from standard pressure P1 to standard pressure P2.

The ratio between the amount v0 of the substance per unit time in the standard pressure change characteristics measurement routine and the amount v1 of the substance per unit time in the verification routine is therefore as follows.

$$(v1/v0)=M\Delta t(273+MTO)/\Delta t(273+TO) \quad (2)$$

Here, the aperture Gv of the valve for bringing about a certain flow is inversely proportional to the fluid pressure. In this embodiment, when the initial pressure MP0 in the standard pressure change characteristics measurement routine and the initial pressure P0 in the test routing are different, different valve apertures bring about the same target flow. In consideration of this point, the above Formula (2) becomes the following Formula (3). Formula (3) is equivalent to Formula (1) relating to the test precision H.

$$(v1/v0)'=M\Delta t(273+MTO)PO/\Delta t(273+TO)MPO \quad (3)$$

The detection precision H is obtained in the following manner from the above equation, assuming MΔt=17640 msec, Δt=11420 msec, MPO=0.4003210 MPa (mega Pascal), PO=0.2589058 MPa, MTO=25.4° C., and TO=24.7° C.

$$H=100.135\%$$

This means that when the gas flow is controlled in the same manner as when shipped, there is a flow error, although slight, of +0.135%.

The test process described above is repeated for each aperture to determine the test precision H of each aperture (step S32).

When the test results are thus obtained, they are stored and simultaneously output and displayed on display means 54, for example, to inform the operator (step S33). If needed, the mass flow detection means 8 is automatically calibrated at the same time based on the test results so as to output the proper flow signal S1 (step S34). Flow deviation occurs, despite the feedback control of the flow control valve 20 by the control means 18 based on the flow set signal S0 and the flow signal S1, possibly because the flow signal S1 does not accurately reflect the actual flow. The calibration process can be done by adjusting the gain of the differential circuit 32 (see FIG. 18), which is an amplifier of the sensor circuit 16, for example.

If necessary, the test precision may be compared to a certain, predetermined permissible range, and warning means 56 can be activated, for example, when the test precision is significantly over the permissible range to alert the operator. The verification routine is complete when the automatic calibration is thus concluded.

The device itself is provided with the verification valve 42 and verification tank 44. As above mentioned, after the test valve 42 has been closed to stop the supply of fluid, the pressure changes in the fluid flowing out of the verification tank 44 are detected, and the pressure changes are compared to the standard pressure changes, for example, making it possible to test whether or not the mass flow of the fluid can be properly controlled.

Because the above test operations can be conducted with the mass flow controller 40 incorporated as such in the gas feed system or the like of the semiconductor manufacturing device, the test can be done extremely rapidly, thereby improving to that extent the operating efficiency of the semiconductor manufacturing device or the like.

In the above embodiment, the test was done while varying the valve aperture (detection temperature set level) in 10% increments, but is not limited to these numerical examples. The sequence in which the pressure detecting means 46 and verification tank 44 are disposed relative to the channel 6 may also be reversed in terms of upstream and downstream locations. The inlet 50A and outlet 50B of the channel 6 were provided separately in the tank main unit 50, but are not limited to that arrangement. A single branched tube may be formed relative to the channel 6, and the tank main unit 50 may be connected in the shape of a "T" to the branched tube.

The various processes described in the above embodiment may be done by digital processing or analog processing. Particularly when done by digital processing, the data may be discrete due to the sampling frequency at which the various types of data are obtained, but in such cases the data can be rounded off from the lowest digit to find points of agreement in the pressure data or the like in the graph illustrated in FIG. 6.

In the first embodiment, when zero point adjustment is done, the verification valve 42 is closed to stop the flow of gas in the channel 6 and determine the flow signal S1 under stabilized conditions, and the zero point adjustment is done based on the resulting level.

Second Embodiment

A second embodiment of the mass flow controller of the invention is described below.

The second embodiment has the function of permitting higher precision zero point adjustment, and also affords a more compact device itself.

As deviation of the flow detection zero point, albeit slight, is unavoidable over time, the zero point is adjusted periodically or non-periodically in this mass flow controller. The flow of the fluid (including gases and liquids) is preferably stopped completely in the device in order to improve the precision during zero point adjustment. In this case, where the flow control valve 20 involves the use of a diaphragm, the properties make it difficult to completely stop the flow of the fluid even when the valve is closed, as there are various micro-leaks, although very slight. Such leaks are not particularly a problem when the design rules of the semiconductor manufacturing process are not all that stringent, but when the demands of finer processing, thinner films, and higher integration require more stringent design rules, such trace leaks cannot be ignored.

In the second embodiment, a more compact zero point measurement valve is provided in order to completely eliminate extremely minute leaks. This point is described below.

Figure 7:
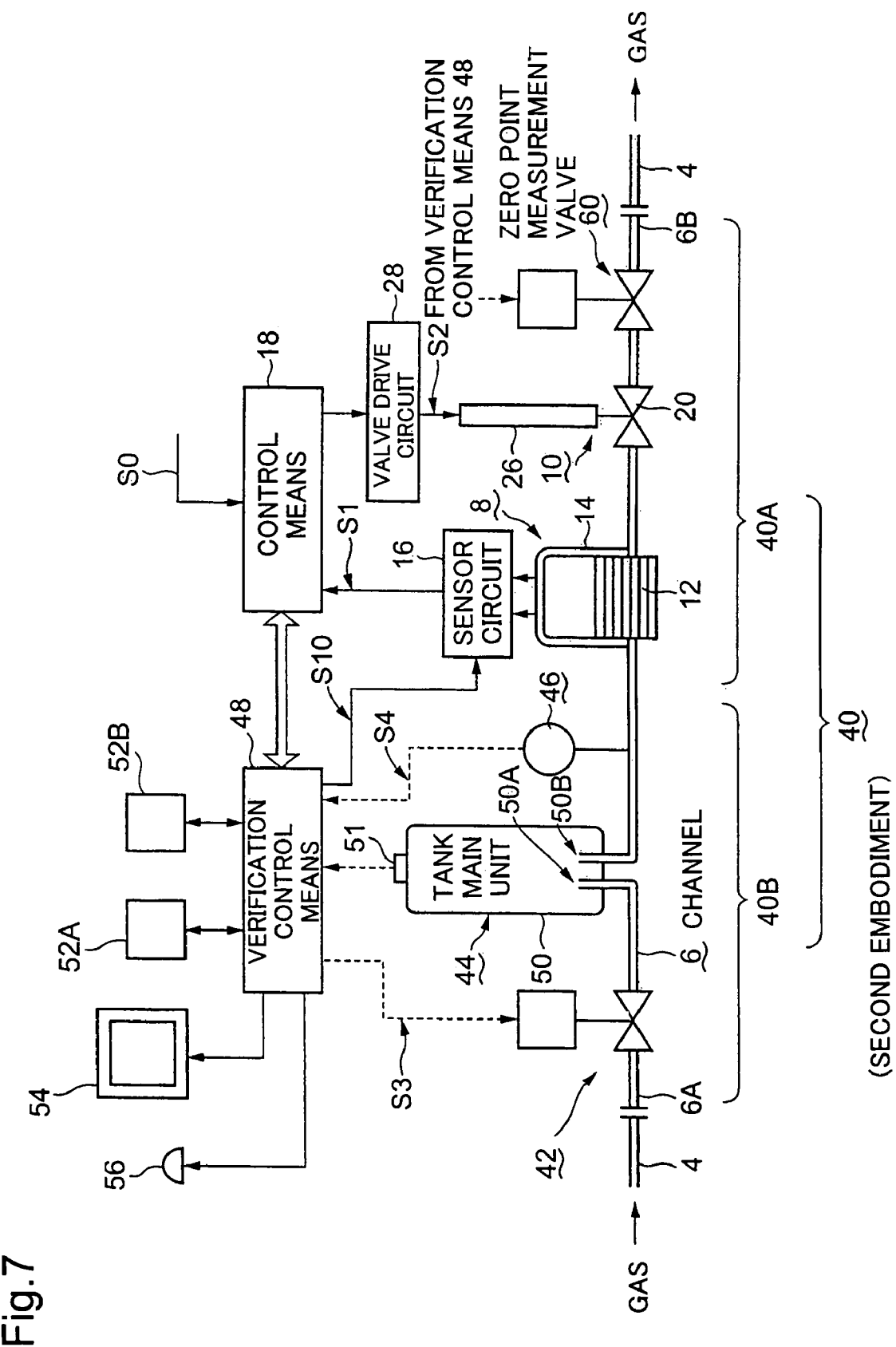
FIG. 7 is a block diagram of a second embodiment of the mass flow control device in the invention.
Figure 8:
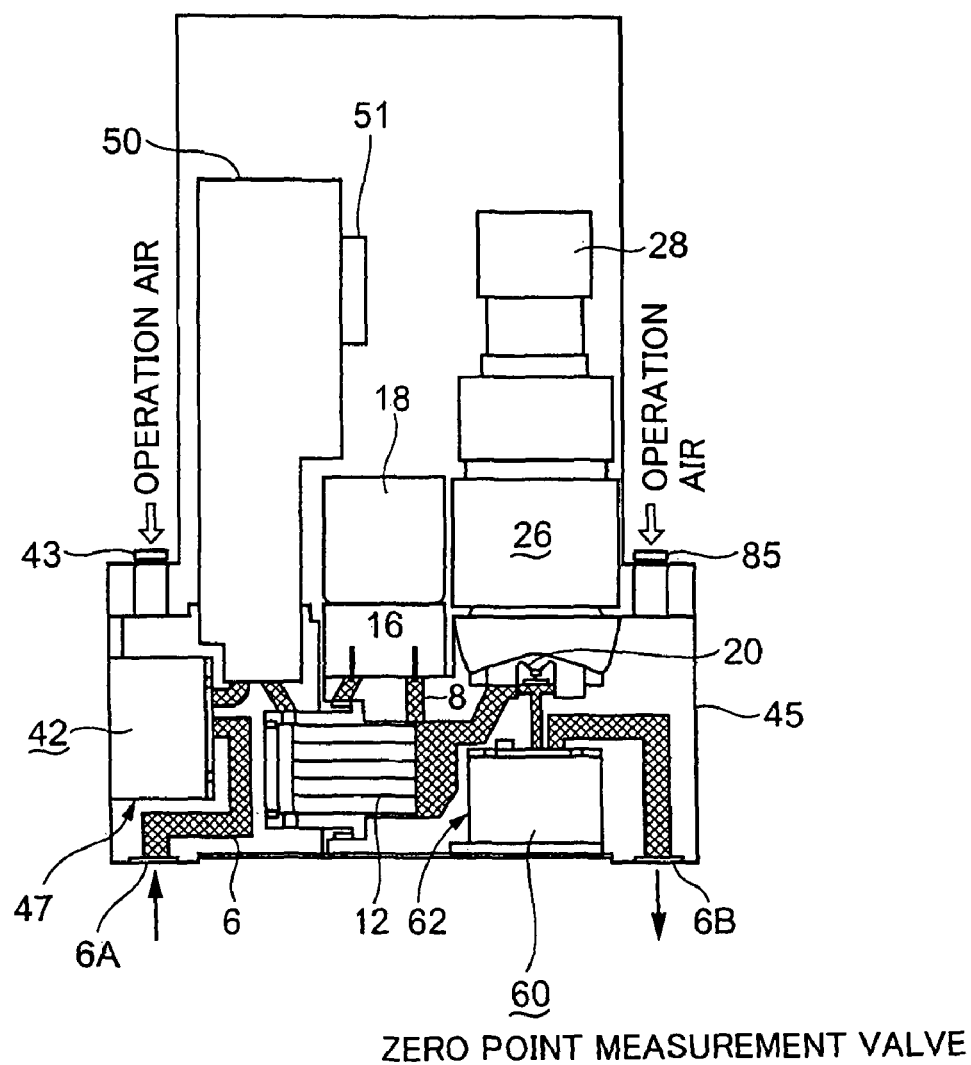
FIG. 8 illustrates the actual lay out of the parts in the second embodiment.

FIG. 7 is a block diagram of the second embodiment of the mass flow control device in the invention. FIG. 8 illustrates the actual lay out of the parts in the second embodiment.

Figure 9:
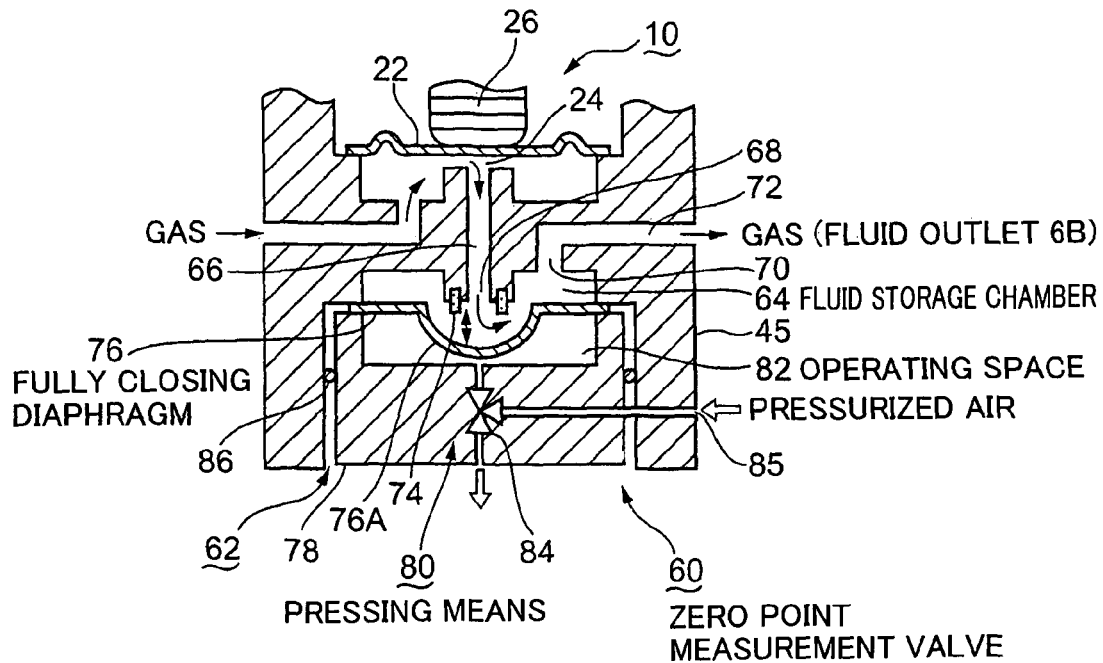
FIG. 9 schematically illustrates the flow control valve and zero point measuring valve while attached.
Figure 10:
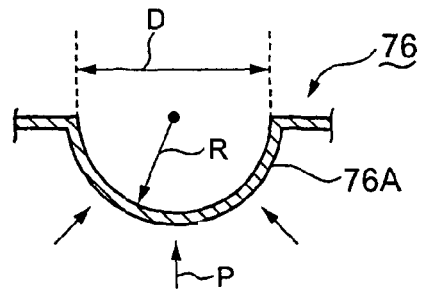
FIG. 10 is a cross section of the fully closing diaphragm of the zero point measuring valve.
Figure 11:
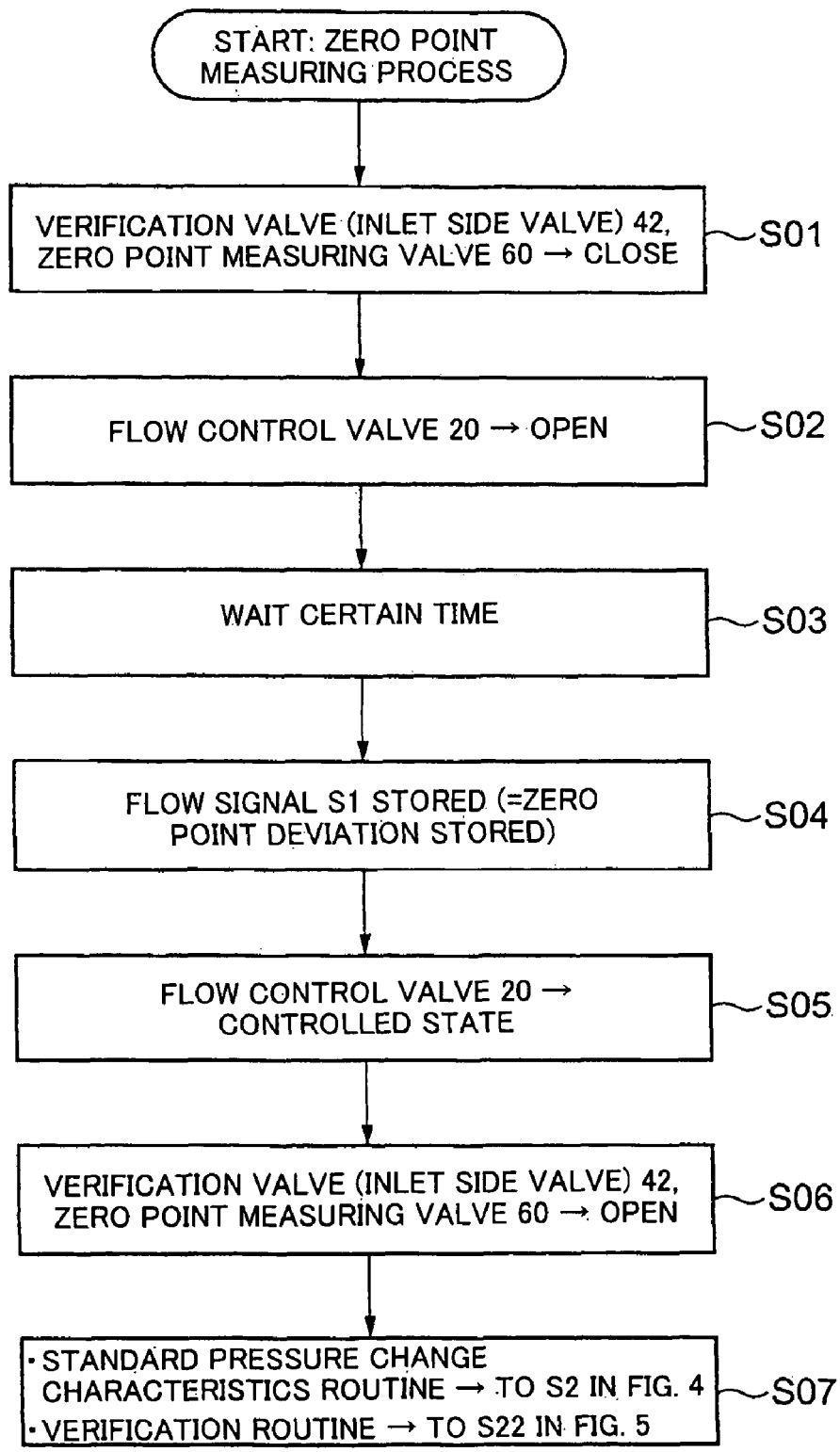
FIG. 11 is a flow chart of the flow in the zero point measuring step.

FIG. 9 schematically illustrates the flow control valve and zero point measuring valve while attached. FIG. 10 is a cross section of the fully closing diaphragm of the zero point measuring valve. FIG. 11 is a flow chart of the flow in the zero point measuring steps.

Parts that are the same as those in FIGS. 1 and 2 are designated by the same symbols and will not be further elaborated. The use of the actuatorless, small valve mechanism employed in the verification valve 42 above will be used in the description of the zero point measurement valve.

As illustrated in FIGS. 7 and 8, a zero point measurement valve 60 is located the furthest downstream in the channel 6, just in front of the fluid outlet 6B. Specifically, an attachment recess 62 is provided in the bottom surface of the mounting basket unit 45 of the mass flow controller (in FIG. 8), and the zero point measurement valve 60 is attached in a liquid- and air-tight manner in the attachment recess 62. The attachment recess 62 is disposed in a location facing the diaphragm 22 of the flow control valve mechanism 10.

As illustrated in FIG. 9, a fluid storage chamber 64 is formed in the attachment recess 62 by more deeply excavating the mounting basket unit 45. The center of the ceiling of the fluid storage chamber 64 protrudes slightly downward in FIG. 9. In this portion, a communication channel 66 is formed so as to communicate with the valve port 24 on the flow control valve mechanism 10 side, allowing gas that has flowed through the valve port 24 to flow into the fluid storage chamber 64. Thus, in relation to the fluid storage chamber 64, the bottom end opening of the communication channel 66 functions as a fluid inlet 68, which is a valve port. The fluid storage chamber 64 is also provided with a fluid outlet 70 through which the gas flows out. The fluid outlet 70 communicates with the fluid outlet 6B side via a channel 72.

A ring-shaped elastic seal member 74, such as an O-ring, is provided protruding partially downward around the fluid inlet 68 serving as the valve port. When the valve is closed as described below, the fluid inlet 68 serving as the valve port is completely closed in a liquid- or air-tight manner, completely blocking the flow of gas. A fully closing diaphragm 76 of bendable and deformable metal is provided, compartmentalizing the bottom of the fluid storage chamber 64. The middle of the fully closing diaphragm 76 has a curved surface component 76A formed in the shape of a downwardly convex curve, and the circumference is fixed by being pressed by means of a fixing member 78 fitted tightly into the attachment recess 62. The fixing member 78 is tightened by means of screw or the like (not shown).

Here, the curved surface 76A is formed in the shape of a dome having a spherical portion, specifically, a dome having a spherical portion which is shorter than a semi-spherical dome shape. The fully closing diaphragm 76 may also be flat, without any curved portion 76A. The fixing member 78 is provided with pressing means 80 for pressing the fully closing diaphragm 76 toward the fluid inlet 68 and closing the fluid inlet 68 functioning as the valve port. The pressing means 80 is formed of an operating space 82 and a valve mechanism 84. The operating space 82 is located on the side opposite the fluid storage chamber 64 on either side of the fully closing diaphragm 76. The valve mechanism 84 allows a pressurized fluid such as pressurized air to be supplied to and discharged from the operating space 82. The valve mechanism 84 is driven to allow the pressurized gas to be fed to and discharged from the operating space 82 as needed. When the pressurized gas is supplied, the fully closing diaphragm 76 having the curved portion 76A is bent and reshaped so that it can fully close the fluid inlet 68.

Under normal condition, when no pressurized gas is supplied to the operating space 82, the fluid inlet 68 is completely open. The valve is the normally open type valve. The valve mechanism 84 is, for example, an electromagnetic three-way valve. The electromagnetic three-way valve can be housed in the fixing member 78 to provide a more compact size overall. In this case, a seal member 86 such as an O-ring is placed between the periphery of the fixing member 78 and the inner surface of the attachment recess 62 to prevent the compressed air in the operating space 82 from leaking out. An electromagnetic three-way valve can thus be used as the valve mechanism 84, allowing compressed air that is always compressed in one direction of the three-way valve to be supplied to and discharged from the operating space 82 as needed. The compressed air is introduced through an 20 operating air inlet 85. An electromagnetic three-way valve can thus be used as the valve mechanism 84, to produce a small, compact actuatorless valve mechanism as the zero point measurement valve 60. The operation of the zero point measurement valve 60 is controlled by the verification control means 48.

The process for measuring the zero point of the flow sensor using the zero point measurement valve 60 constructed in the above manner is described below.

The zero point measuring process may be carried out periodically or non-periodically, but is preferably done immediately before implementing the standard pressure change characteristics measurement routine illustrated in FIG. 4 or immediately before the measurement routine illustrated in FIG. 5.

As illustrated in FIG. 11, to implement the zero point measurement process, the verification valve 42 located farthest upstream in the channel 6 and the zero point measurement valve 60 located farthest downstream in the channel 6 are both closed to close the valves and completely block the flow of gas in the channel 6 (S01). That is, the flow of gas in the sensor tube 4 is completely stopped. At this time, the flow control valve 20 of the flow control valve mechanism 10 is kept open (S02).

When the stoppage of the flow of gas in the channel 6, particularly in the sensor tube 4, has stabilized in this state (S03) after a certain time has passed, the flow signal S1 of the sensor circuit 16 at that time is detected, and the detected value is stored as the zero point deviation level in the memory (not shown) of the control means 18 (S04). In other words, a certain output level from the verification control means 48 or control means 18 measurement system (flow sensor) is established as electrically representing "zero flow" (offset adjustment) on the basis of the stored deviation level. In this case, as noted above, the zero point measurement valve 60 can completely block gas (fluid) leaks, enabling highly accurate zero point measurement. At that point in time, the above deviation level is stored without adjusting the zero point, and the zero point is finally adjusted, either automatically or by operator command, in the verification routine. That is, in S34 of the test routing illustrated in FIG. 5, the above zero point deviation level and the flow deviation level determined in the verification routine are automatically calibrated to adjust both the zero point and the flow deviation. In this case, the deviation levels of the measured results may be displayed without the automatic calibration, and they may be calibrated as needed upon command by the operator after viewing the results.

In FIG. 11, when the value of the flow signal S1 is stored in S04, the flow control valve 20 shifts to the normal control state (S05), and the verification valve 42 and zero point measurement valve 60 are both opened (S06). In the case of the standard pressure change characteristics measurement routine, the next step is S2 in FIG. 4 (S1 is skipped), and in the case of the test routing, the next step is S22 in FIG. 5 (S21 is skipped) (S07).

In the above case, as illustrated in FIG. 10, test results confirmed that it was possible to maintain a leak-free completely closed state within the range complying with the following relational expression, where D is the diameter of the circle at the end surface of the curved surface 76A formed in the shape of a dome having a spherical portion in the completely closing diaphragm 76, R is the radius of the sphere, P1 is the pressure of compressed air, and P2 is the pressure in the fluid storage chamber 64.

$$2 < R/D < 10 \text{ (when } P1-P2 \geqq 0.1 \text{ MPa)}$$

The curved surface 76A can be partially spherical, such as a semi-spherical dome shape, but is not limited to that shape. Any curved surface will do, such as a shape with a dome-shaped portion having an elliptical cross section, provided that it can bring about a completely closed state in which the flow of gas is completely stopped. As noted previously, the fully closing diaphragm 76 may also have a flat shape.

A small actuatorless valve mechanism housing an electromagnetic three-way valve as the valve mechanism 84 can be used as the zero point measurement valve 60 to make it more compact and save space.

Although it will depend on the design dimensions of the device, since the zero point measurement valve 60 is disposed opposite the flow control valve mechanism 10, the communication channel 66 communicating with the fluid inlet 68 of the fluid storage chamber 64 and the valve port 24 opened and closed by the diaphragm 22 will have a lower volume, thus minimizing dead volume which cannot be controlled by the device when gas is flowing.

As noted above, such a small actuatorless valve mechanisms can also be used for the verification valve 42 illustrated in FIG. 2.

Figure 12:
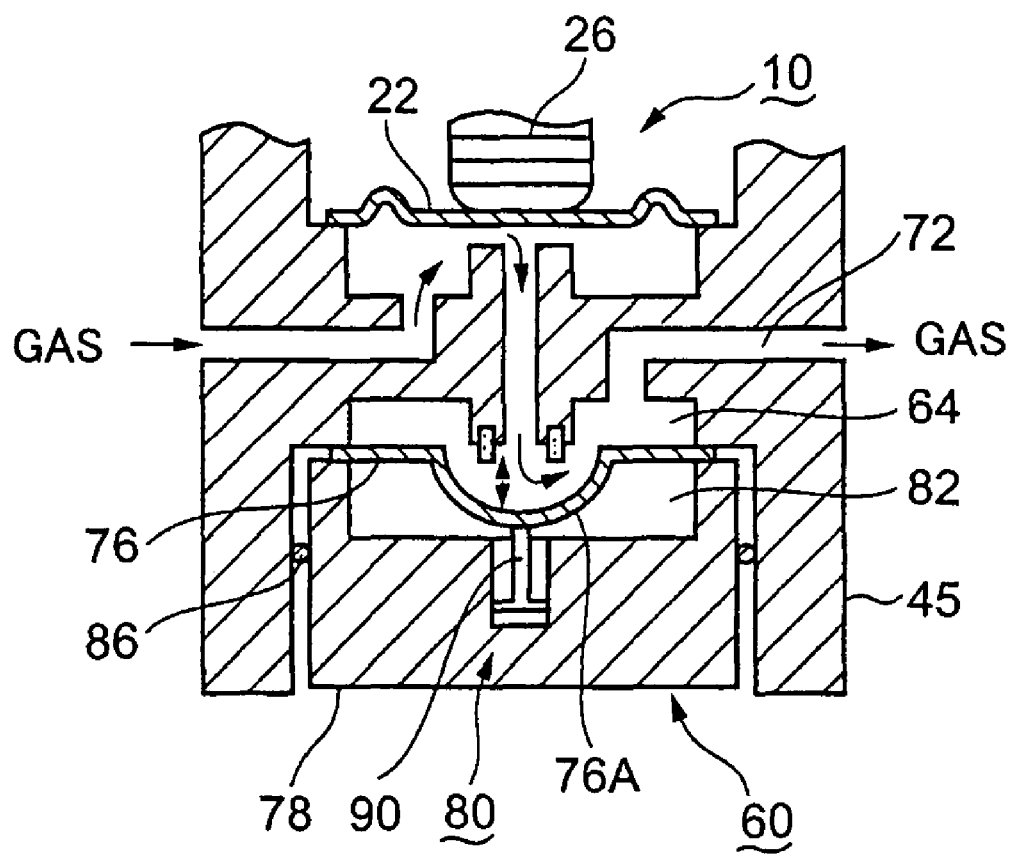
FIG. 12 illustrates a piston type actuator having a piston.

In the second embodiment described above, a small actuatorless valve mechanism housing an electromagnetic three-way valve was used as the pressing means 80 of the zero point measurement valve 60, but it is also possible to use a piston actuator having a piston 90 that comes into contact with the fully closing diaphragm 76 and presses it, as in the variant illustrated in FIG. 12.

The zero point measurement valve 60 is located on the side opposite the verification valve 42 on either side of the bypass tube 12 and sensor tube 14. Thus, when the verification valve 42 is located further downstream than the bypass tube 12, for example, the zero point measurement valve 60 is further upstream than the bypass tube 12.

Third Embodiment

Figure 13:
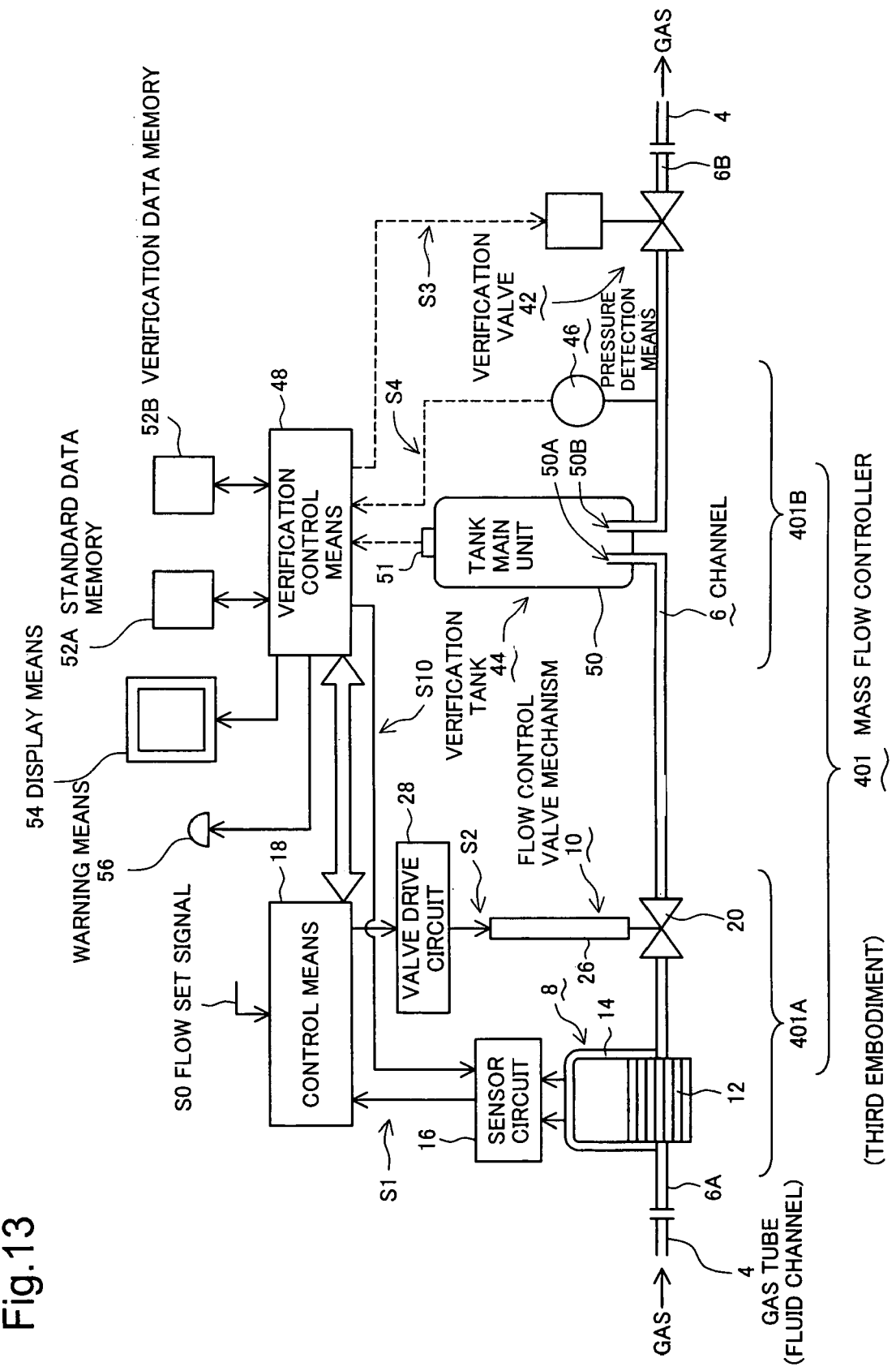
FIG. 13 is a block diagram of a third embodiment of the mass flow control device in the invention.

FIG. 13 is a block diagram of a third embodiment of the mass flow control device in the invention. The mass flow controller 401 in the third embodiment differs from the mass flow controller 40 of the first embodiment in that the testing unit 401B is downstream from the mass flow control component 401A in the channel 6. The testing unit 401B of the mass flow controller 401 in the third embodiment differs from the testing unit 40B of the mass flow controller 40 in the first embodiment in that the verification valve 42 is downstream of the verification tank 44 and pressure detecting means 46. The structure of the mass flow controller 401 is otherwise the same as the mass flow controller 40 in the first embodiment.

In the third embodiment, a vacuum is first created in the tank main unit 50 by closing the upstream side flow control valve 20, resulting in a reduced pressure state. The verification valve 42 is then closed, and the flow control valve 20 is opened to a certain extent to determine how much the pressure in the channel 6, including the tank main unit 50, increases. The mass flow control component 401A is then tested based on the pressure change.

<Standard Pressure Change Characteristics Measurement Routine in Third Embodiment>

Figure 14:
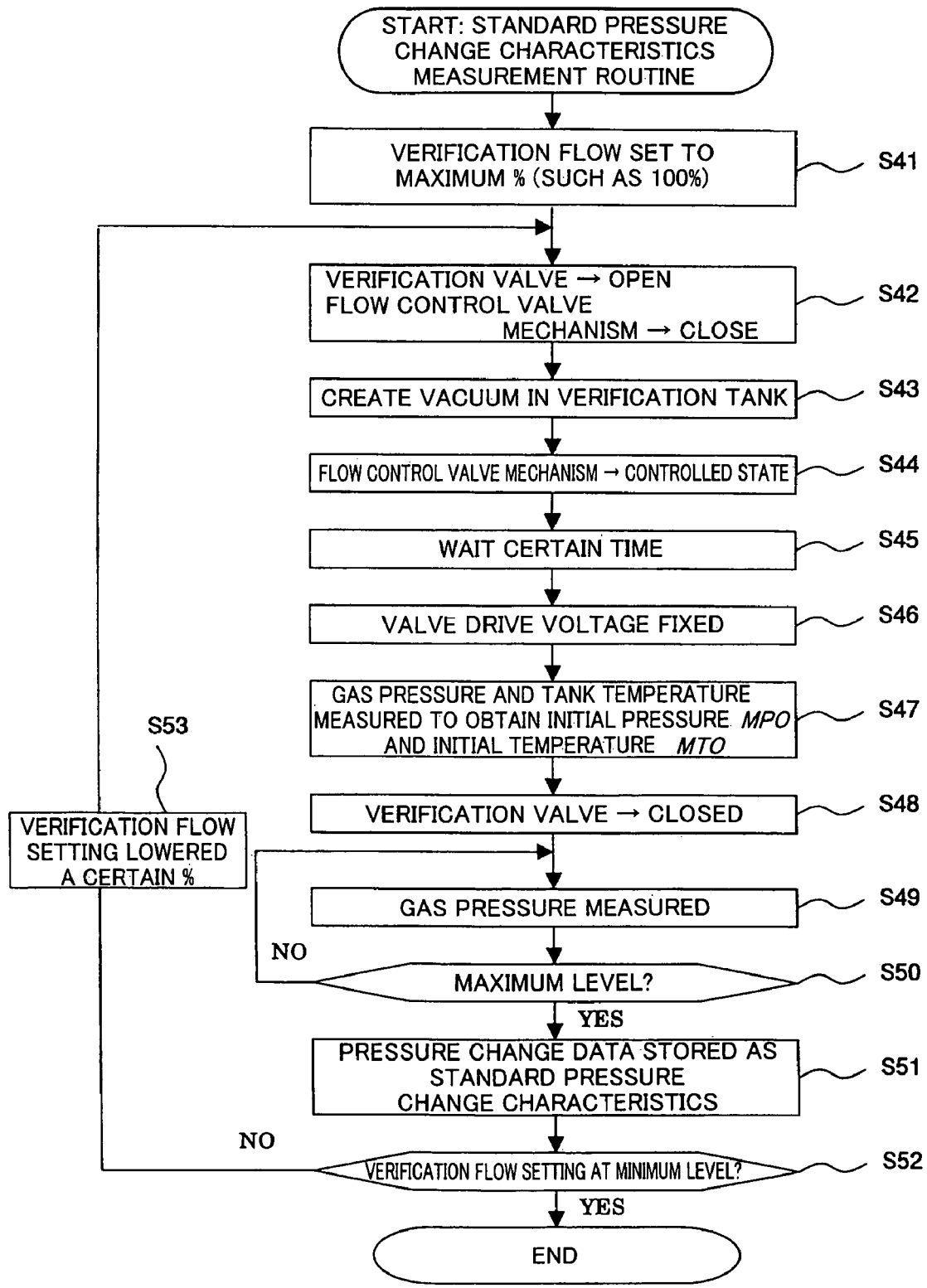
FIG. 14 is a flow chart of the steps in the standard pressure change characteristic measurement routine in the third embodiment.

FIG. 14 is a flow chart of the steps in the standard pressure change characteristic measurement routine in the third embodiment. When the standard pressure change characteristics are obtained, a flow set signal S0 is first set to full scale (such as 5 V) representing the maximum flow set value (100%, for example) in step S41.

In step S42, the verification valve 42 is opened, and the flow control valve 20 is closed. In step S43, a vacuum is created by suctioning the gas with a vacuum pump (not shown) out of the downstream fluid outlet 6B, resulting in a low pressure state in the tank main unit 50 of the verification tank 44 and in the channel 6 downstream of the flow control valve 20.

In step S44, the control means 18 opens the flow control valve 20, and controls the flow control valve 20 of the flow control valve mechanism 10 according to the flow set signal S0 so as to result in the flow previously set in step S41 (the maximum flow in this case). As a result, $N_2$ gas flows from the gas feed source, through the flow control valve 20, channel 6, and tank main unit 50, toward the downstream vacuum pump. During the test, the flow set signal S0 is sent to the control means 18 by the verification control means 48, not the host computer, just as it is in the first embodiment (see FIG. 13).

Then, in step S45, the process waits for a certain amount of time (such as 6 seconds) until the gas flow level has stabilized. Then, in step S46, the valve drive voltage S2 is fixed at the voltage level prevailing at that time, to fix the aperture of the flow control valve 20.

In step S47, after the flow of gas has stabilized over a certain period of time (such as several seconds) after the aperture of the flow control valve 20 has been fixed, the gas flow pressure prevailing at that time as determined by the pressure detecting means 46 is stored as the initial pressure MPO in the standard data memory 52A. The temperature of the tank at that time as detected by the temperature detection means 51 is stored as the initial temperature MT0 in the standard data memory 52A.

In step S48, the verification valve 42 is closed. As a result, the flow is blocked from the gas feed source and tank main unit 50 to the downstream vacuum pump, and the suctioning of $N_2$ gas is stopped. However, because $N_2$ gas is then supplied from the gas fee source to the tank main unit 50, the gas flows through the flow control valve 20 and into the channel 6 upstream from the verification valve 42, and into the tank main unit 50. As a result, the pressure increases in the channel 6 upstream from the verification valve 42 and in the tank main unit 50.

In step S49, the pressure of the gas in the channel 6 is measured by the pressure detecting means 46 at certain intervals, such as every 1 msec. In step S50, it is determined whether or not the pressure of the gas in the channel 6 has reached the pre-determined maximum limit. If the pressure of the gas in the channel 6 has not reached the maximum, the process returns to step S49 to continue measuring the pressure. When the pressure of the gas in the channel 6 has reached the maximum, the measurement of the gas pressure in the channel 6 is complete.

In step S51, the resulting pressure change data (measured gas pressure values at each point in time) is stored as the standard pressure change characteristics in the standard data memory 52A in conjunction with the aperture (or the valve opening degree). In step S41, the flow set signal S0 is set to the level representing an aperture of 100%. The standard pressure change characteristics stored in the standard data memory 52A when the process is initially carried out in step S51 are thus the standard pressure change characteristics an aperture of 100%.

Then, in step S52, it is determined whether or not the flow set level represented by the flow set signal S0 is under the pre-determined minimum. When step S52 is first reached, since the flow set signal S0 is set to the level representing an aperture of 100%, the result of the determination in step S52 is NO. The process advances to step S53.

In step S53, the aperture represented by the flow set signal S0 given to the control means 18 is reduced in certain increments. The process then returns to step S42. When, for example, the aperture is reduced 10% in step S53, the pressure is determined at an aperture of 90% in the subsequent steps S43 through S51, and the results are stored as the standard pressure change characteristics at an aperture of 90% in the standard data memory 52A.

When the process returns from step S53 to step S42, the pressure in the tank main unit 50 and in the channel 6 has reached the maximum (see step S50). However, in steps S42 and S43, a vacuum is created in the tank main unit 50 while the flow control valve 20 is closed. The pressure in the tank main unit 50 and the channel 6 thus becomes low enough for testing again.

The changes in pressure are then similarly measured at varying apertures, and the standard pressure change characteristics are stored in conjunction with the apertures (set flow levels) in the standard data memory 52A. In step S52, when it is determined that the flow set level represented by the flow set signal S0 is under the minimum, the process for obtaining the standard pressure change characteristics is complete.

<Verification Routine in Third Embodiment>

Figure 15:
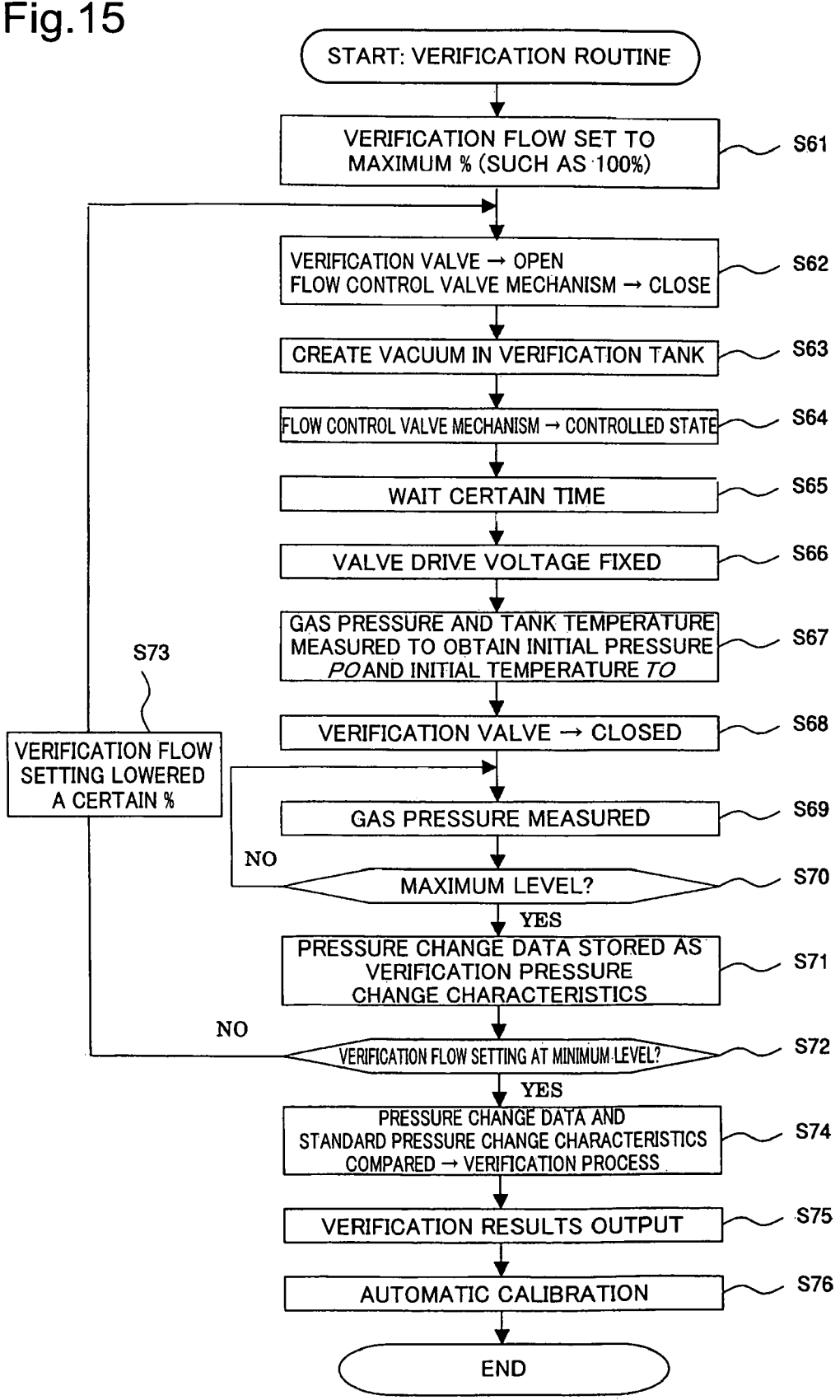
FIG. 15 is a flow chart of the steps in the verification routine in the third embodiment.

FIG. 15 is a flow chart of the steps in the verification routine in the third embodiment. In the flow of FIG. 15, the process in steps S61 through S73 are the same in principle as the process in steps S41 through S53 in FIG. 14.

However, whereas the standard pressure change characteristics measurement routine is carried out at the plant, for example, where the mass flow controller 401 is itself produced, before the mass flow controller 401 is shipped from the plant, the verification routine is carried out while the mass flow controller 401 is incorporated in the gas feed line for semiconductor-producing devices or the like. As such, the gas suctioning in steps S63 through S67 is done by a vacuum pump (not shown) connected to a semiconductor-producing device or the like (not shown) that is connected to a gas tube 4 (see FIG. 13) downstream in the gas feed line.

In the verification routine, the data is stored in the testing data memory 52B, not the standard data memory 52A. That is, in step S71 in FIG. 15, the pressure change data (measured gas pressure levels at each point in time) is stored as test pressure change characteristics in conjunction with apertures in the testing data memory 52B. In step S67, the gas flow pressure measured by the pressure detecting means 46 after a certain time (such as several seconds) after the aperture of the flow control valve 20 has been fixed is stored as the initial pressure P0 in the testing data memory 52B. The temperature in the tank at that time as detected by the temperature detection means 51 is stored as the initial temperature T0 in the testing data memory 52B.

The rest of the process in steps S61 through S73 in FIG. 15 is the same as the process in steps S41 through S53 in FIG. 14. In the process in steps S61 through S73, the changes in pressure are measured at a plurality of apertures, and the resulting test pressure change characteristics in conjunction with the aperture levels are stored in the testing data memory 52B.

Figure 16:
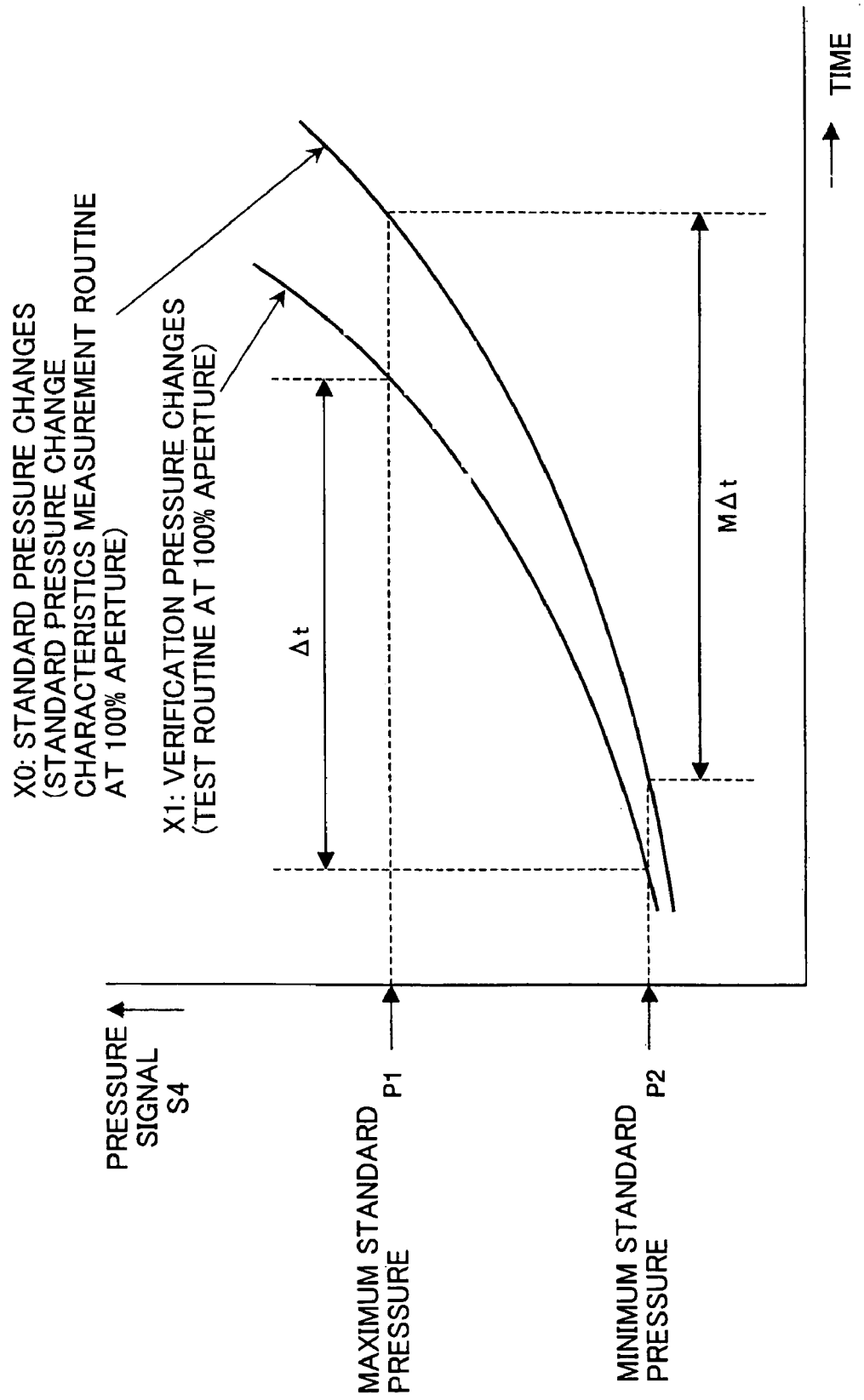
FIG. 16 is a graph of examples of pressure signal S4 levels by the pressure detector means 46 respectively representing standard pressure change characteristics and test pressure change characteristics at an aperture of 100%.

FIG. 16 is a graph of examples of pressure signal S4 levels by the pressure detector means 46 representing various standard pressure change characteristics and test pressure change characteristics at an aperture of 100%. The characteristic curve X0 indicates standard pressure change characteristics at an aperture of 100% (see step S51 in FIG. 14), and the characteristic curve X1 indicates test pressure change characteristics at an aperture of 100% (see step S71 in FIG. 15).

In the third embodiment, MΔt and Δt are determined as follows in relation to the predetermined pressure range from the maximum standard pressure P1 to the minimum standard pressure P2. That is, MΔt is the time from when the pressure obtained in the standard pressure change characteristics measurement routine has reached the minimum standard pressure P2 until it reaches the maximum standard pressure P1. Δt is the time from when the pressure obtained in the verification routine has reached the minimum standard pressure P2 until it reaches the maximum standard pressure P1.

The test accuracy H for aperture is obtained by substituting the MΔt and Δt at the certain resulting apertures, the initial pressure MP0 and initial temperature MT0 obtained in step S47 in FIG. 14, and the initial pressure P0 and initial temperature T0 obtained in step S67 in FIG. 15 into Equation (1).

In step S74 of FIG. 15, the test accuracy H is calculated for a plurality of apertures in this manner. In step S75, the test accuracy H for each aperture is displayed by the display means 54. In step S76, the mass flow detection means 8 is automatically calibrated based on the test accuracy H at each aperture. The process in steps S75 and S76 is the same as the process in steps S33 and S34 in FIG. 5.

This embodiment allows mass flow controllers to be tested while incorporated in gas feed lines to semiconductor-producing devices and the like.

In the above embodiments, the pressure detecting means 46 was located downstream of the tank main unit 50. However, the pressure detecting means 46 may be located upstream of the tank main unit 50 and/or flow control valve 20, and the pressure in the channel 6 can be detected at those locations. In another possible embodiment, the pressure detecting means 46 can detect the pressure in the tank main unit 50. That is, the pressure detection means may be located on the same side as the flow control valve for controlling the mass flow of the fluid flowing in the channel, relative to the verification valve component for closing the channel, and can detect the pressure of the fluid in the channel, including the tank main unit. However, the pressure detection means is preferably located between the test valve component and the flow control valve.

In the above embodiments, the temperature detection means 51 was located in the tank main unit 50. However, the temperature detection means 51 may be located upstream of the tank main unit 50 and/or flow control valve 20, and the temperature of the fluid in the channel 6 can be detected at those locations. In another possible embodiment, the temperature detecting means 51 can be located downstream of the tank main unit 50 and/or flow control valve 20, and the temperature of the fluid in the channel 6 can be detected at those locations. That is, the temperature detection means may be located on the same side as the flow control valve for controlling the mass flow of the fluid flowing in the channel, relative to the verification valve component for closing the channel, and can detect the temperature of the fluid in the channel, including the tank main unit, in those locations.

In the above embodiments, the tank main unit 50 was provided in stainless steel, and the gas inlet 50A and outlet 50B connected to the channel 6 were provided in its floor. However, the tank can have another structure. For example, the channel can be provided with a component having a cross sectional area that is greater than other parts and is perpendicular to the direction of the gas flow, and this portion can be used as a tank. Instead of a tank, a plurality of curved components can be provided in the channel connecting the test valve that closes the channel and the flow control valve for controlling the mass flow of the fluid flowing through the channel. The plurality of curved components provide a channel that is longer than when the flow control valve and test valve are linearly linked. This portion can be used instead of a tank. That is, the flow controller can have a structure in which the fluid is collected between the test valve and flow control valve.

In the above embodiments, the initial pressure levels MP0 and P0, and the initial temperatures MT0 and T0, were the pressure and temperature when the test valve 42 was closed. However, the initial pressure and temperature used in the test may be the fluid pressure and temperature at other points in time. For example, the initial pressure and temperature used in the test may be the pressure and temperature at a point in time after a predetermined period of time has passed after the test valve 42 is closed. They may also be the temperature and pressure at a certain predetermined retroactive period of time from the point in time at which the test valve 42 is closed. That is, the initial pressure and temperature used in the test can be temperatures and pressure levels at points in time included in certain time divisions, including points in time when the channel is closed by the test valve.

The present invention was described in detail above with reference to preferred illustrated embodiments. However, the invention is not limited to the structures and embodiments described above. The invention includes various modifications and equivalent structures. Moreover, although the various elements of the invention which have been disclosed were disclosed in various combinations and structures, those are illustrations, and the elements may be more or fewer. The elements may also be a single element. Such embodiments are included within the scope of the present invention.

INDUSTRIAL APPLICABILITY

The present invention is applicable to devices for supplying proper amounts of gas to a target device used while maintaining the interior at low pressure, such as various semiconductor manufacturing devices involving CVD film-forming, etching, and the like.

The invention claimed is:

1. A flow control device for controlling a flow of a fluid in a channel in which the fluid is supplied to a target where a pressure is lower than a fluid supply source, comprising:
   a first opening and closing valve for opening and closing the channel;
   a flow control component with a flow control valve mechanism that controls the flow of the fluid flowing through the channel by adjusting an aperture of the flow control valve mechanism, the flow control component including a flow detector generating a flow detection signal indicative of a flow rate of fluid through the flow control component;
   an accumulator in which the fluid flowing through the channel can be held between the first opening and closing valve and the flow control component;
   a pressure detector disposed upstream of the flow control component, the pressure detector configured to generate a pressure detection signal indicative of the pressure of the fluid in the channel; and
   a control system for controlling operation of the flow control device, the control system receiving the flow detection signal and the pressure detection signal;
   the control system having a normal operating mode in which the first opening and closing valve is open and the control system adjusts a valve drive signal so that the aperture has an opening size dynamically selected to regulate a mass flow rate based on a target mass flow rate and the flow detection signal;
   the control system further having a test mode in which the first opening and closing valve is closed, the valve drive signal is set to fix an aperture size of the flow control valve mechanism during a measurement period and pressure change characteristics corresponding to decreases in pressure over time are monitored, wherein during the measurement period the pressure at the valve aperture is unregulated and a time-changing pressure at the aperture of the valve results in a non-constant flow rate of the fluid through the aperture; and
   the control system determining deviations from standard levels of predetermined standard pressure change characteristics associated with the aperture size used during the measurement period of the test mode to calibrate flow rates of the flow detector.

2. The flow control device of claim 1, wherein during the test mode a test fluid is used that is different from a process fluid used in the normal operating mode.

3. The flow control device of claim 2, wherein the test fluid is nitrogen gas.

4. The flow control device of claim 1, wherein during the test mode a vacuum is applied to a downstream side of an output of the flow control device.

5. The flow control device of claim 1, wherein during the test mode there is an inversely proportional relationship for a given flow between pressure and aperture size.

6. The flow control device of claim 1, wherein during the test mode there are a plurality of measurement periods to test a plurality of different aperture sizes with each measurement period testing one respect aperture size with the resulting pressure change characteristic being compared with a corresponding respective predetermined standard pressure change characteristic associated with the aperture size with the control system calculating deviations for the plurality of aperture sizes tested.

7. A flow control device in accordance with claim 1 further comprising
   a second opening and closing valve for opening and closing the channel on a side opposite the first opening and closing valve relative to the flow detector, wherein
   the control system is capable of adjusting an output level representing zero flow by the flow detector.

8. A flow control device in accordance with claim 1, further comprising
   a temperature detector capable of measuring a temperature of the fluid on the same side as the flow control valve mechanism relative to the first opening and closing valve, wherein
   the control system further calculates the deviations from standard levels based on:
       an initial pressure PO of the fluid at a first time in a certain time interval including a time the channel is closed by the first opening and closing valve,
       an absolute temperature T1 of the fluid at a second time period in the certain time interval, and
       a time period $\Delta t$ from a time the pressure of the fluid reaches a certain first standard pressure P1 after the channel is closed by the first opening and closing valve until a time the pressure reaches a certain second standard pressure P2 which is different from the first standard pressure P1.

9. A flow control device in accordance with claim 8, wherein
the control system calculates the deviations from the standard levels based on a ratio between PO/(T1×Δt) and a certain constant related to the standard level.

10. A method for adjusting a flow control device that controls a flow of a fluid in a channel in which the fluid is supplied to a target where a pressure is lower than a fluid supply source, the flow control device comprising; a first opening and closing valve for opening and closing the channel; a flow control component with a flow control valve mechanism which controls the flow of the fluid flowing through the channel by adjusting an aperture of the flow control valve mechanism according to a valve driving signal, and an accumulator in which the fluid flowing through the channel can be held between the first opening and closing valve and the flow control valve mechanism, the method comprising:
during a normal operating mode delivering a fluid with a mass flow rate of the fluid regulated by adjusting the valve aperture based on a first signal indicative of a target mass flow rate and a second signal indicative of a measured mass flow rate;
in a test mode, performing a verification of the accuracy of the measured mass flow rate, including:
a) fixing the aperture of the flow control valve mechanism at a selected aperture opening by fixing the valve driving signal;
b) closing the channel using the first opening and closing valve;
c) measuring changes in a pressure of the fluid in the channel at a predetermined first position on a same side as the flow control valve mechanism relative to the first opening and closing valve after the steps a) and b), wherein the aperture remains fixed at the selected aperture opening during the step c) and wherein the pressure at the aperture is not regulated during step c) such that decreases in pressure generate a resultant decrease in mass flow through the selected aperture;
d) calculating a deviation of the flow controlled by the flow control component from a standard level associated with the selected aperture opening based on comparing the measured pressure changes to predetermined pressure change characteristics ; and
e) determining from the deviation if a flow calibration of the flow control component is required to achieve a target mass flow rate accuracy and generating a required flow calibration based on the deviation from the standard level.

11. A method in accordance with claim 10, wherein
the flow control component further comprises a flow detector capable of measuring the flow of the fluid flowing through the channel on the same side as the flow control valve mechanism relative to the first opening and closing valve, and controls the flow of the fluid flowing through the channel by adjusting the aperture of the flow control valve mechanism based on a target flow and the flow measured by the flow detector,
the step e) comprising the step of adjusting an output level representing the flow by the flow detector based on the deviation from the standard level.

12. A method in accordance with claim 11, further comprising the steps of:
f) closing the channel using the first opening and closing valve, and closing the channel using a second opening and closing valve on a side opposite the first opening and closing valve relative to the flow detector;

g) reading the output level representing the flow by the flow detector while the channel is closed by the first and second opening and closing valves; and
h) adjusting an output level representing zero flow by the detector.

13. A method in accordance with claim 10, further comprising:
in the test mode utilizing a test fluid different from that used in the normal operating mode and applying a vacuum downstream of the flow control component.

14. A method in accordance with claim 10, wherein
the step d) further comprises the step of
calculating the deviation from the standard level based on:
an initial pressure PO of the fluid in the first position at a first time in a certain time interval including a time the channel is closed by the first opening and closing valve;
an absolute temperature T1 of the fluid in a predetermined second position on a same side as the first position relative to the first opening and closing valve at a second time in the certain time interval; and
a time period Δt from a time the pressure of the fluid reaches a first standard pressure P1 at the first position after the channel is closed by the first opening and closing valve until a time the pressure reaches a second standard pressure P2 which is different from the first standard pressure P1.

15. A method in accordance with claim 14, wherein
the step d) further comprises the step of
calculating the deviation from the standard level based on a ratio between PO/(T1×Δt) and a certain constant related to the standard level.

16. A method for testing a mass flow control device, wherein the mass flow control device has a channel through which a fluid flows; a flow detector for detecting a mass flow of a fluid that flows through the channel and outputting a flow signal; and a flow control component with a flow control valve mechanism that controls the mass flow by altering a valve aperture by means of valve drive signals; and a deviation measurement/control component which has in the channel a first opening and closing valve for opening and closing the channel; an accumulator in which the fluid flowing through the channel can be held between the first opening and closing valve and the flow control valve mechanism; and a pressure detector for detecting a pressure of the fluid and outputting a pressure detection signal, and controls the first opening and closing valve and the accumulator and the pressure detector to perform a mass flow test operation wherein the pressure of the fluid is not regulated at the valve aperture during at least a portion of the mass flow test operation; wherein the testing method comprises the steps of:
setting a verification flow by fixing an aperture of the flow control valve mechanism at a selected aperture opening by fixing the valve drive signal;
ensuring a stable flow of a fluid for the test in the channel;
detecting a pressure of the flowing fluid and a temperature of the accumulator to determine an initial pressure and an initial temperature respectively;
closing the channel using the first opening and closing valve;
measuring changes in a pressure of a fluid flowing from the accumulator after the closure of the channel while the aperture of the flow control valve remains fixed at the selected aperture opening according to the fixed valve drive signal, wherein the measured pressure changes are indicative of changes in flow rate of the fluid through the aperture; and performing a comparison of the measured pressure changes to a predetermined standard pressure change characteristic associated with the selected aperture opening; and calibrating the flow detector using the comparison, wherein in a normal mode of operation the calibrated flow detector is used to provide an indication of how the aperture is to be adjusted to achieve a target mass flow rate.

17. A method for testing a mass flow control device in accordance with claim 16, further comprising calibrating the flow detector automatically based on the comparison.

18. A method for testing a mass flow control device in accordance with claim 16, the testing method further comprising testing a plurality of different aperture openings and for each aperture opening performing a comparison of the measured pressure changes to a predetermined standard pressure change characteristic associated with the aperture opening to generate a set of comparisons, and calibrating the flow detector using the set of comparisons.

19. A method for testing a mass flow control device in accordance with claim 16, further comprising, before the step for setting the verification flow, measuring a zero point by blocking the flow of the fluid flowing in the channel.

20. A flow control device for controlling a flow of a fluid in a channel in which the fluid is supplied to a target where a pressure is lower than a fluid supply source, the device comprising:

a first opening and closing valve for opening and closing the channel;

a flow control component with a flow control valve mechanism for controlling the flow of the fluid flowing through the channel;

a pressure detector capable of detecting a pressure of the fluid on a same side as the flow control valve mechanism relative to the first opening and closing valve; and a deviation measurement/control component for calculating a deviation of the flow controlled by the flow control component from a standard level, the device further arranged so that a fluid flow path between the flow control component and pressure detector consists of one of a gas flow tube or a mass flow detection system; wherein the deviation measurement/control component in a test mode:

fixes an aperture of the flow control valve mechanism at a selected aperture opening and measures changes in the pressure using the pressure detector while the channel is closed by the first opening and closing valve, wherein the aperture remains fixed at the selected aperture opening during the pressure change measurement and the pressure is unregulated at the aperture such that the mass flow decreases with decreasing pressure, and calculates the deviation from the standard level associated with the selected aperture opening based on the measured changes in the pressure to calibrate the flow.

\* \* \* \* \*

UNITED STATES PATENT AND TRADEMARK OFFICE
CERTIFICATE OF CORRECTION

| | |
|---|---|
| PATENT NO. | : 7,918,238 B2 |
| APPLICATION NO. | : 10/569783 |
| DATED | : April 5, 2011 |
| INVENTOR(S) | : Makoto Tanaka et al. |

Page 1 of 1

It is certified that error appears in the above-identified patent and that said Letters Patent is hereby corrected as shown below:

Column 7, line 5, change "Firs" to --First--.

Column 10, lines 31 to 41, Please delete entire paragraph.

Column 13, line 7, change "An" to --$\Delta$n--.

Column 13, line 33, please amend "MTO=25.4C." to read --MTO=25.4C--.

Column 16, line 6, please delete "20".

Signed and Sealed this
Thirteenth Day of March, 2012

David J. Kappos
*Director of the United States Patent and Trademark Office*